(12) United States Patent
Wohlgenannt et al.

(10) Patent No.: US 12,339,360 B2
(45) Date of Patent: Jun. 24, 2025

(54) MULTI-BEAM MEASURING DEVICE

(71) Applicant: HEXAGON TECHNOLOGY CENTER GMBH, Heerbrugg (CH)

(72) Inventors: Rainer Wohlgenannt, Klaus (AT); Martin De Lange, Kesswil (CH); Benjamin Seifert, Grabs (CH); Simon Bestler, Langenargen (DE); Jürg Hinderling, Marbach (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 1228 days.

(21) Appl. No.: 17/082,910

(22) Filed: Oct. 28, 2020

(65) Prior Publication Data

US 2021/0124049 A1    Apr. 29, 2021

(30) Foreign Application Priority Data

Oct. 29, 2019  (EP) .................................... 19205917
Oct. 28, 2020  (EP) .................................... 20204389
Oct. 28, 2020  (EP) .................................... 20204461

(51) Int. Cl.
*G01S 17/10*    (2020.01)
*G01S 7/484*    (2006.01)
(Continued)

(52) U.S. Cl.
CPC .............. *G01S 17/10* (2013.01); *G01S 7/484* (2013.01); *G01S 7/4865* (2013.01); *G01S 7/497* (2013.01); *G01S 17/89* (2013.01)

(58) Field of Classification Search
CPC ........ G01S 17/10; G01S 7/484; G01S 7/4865; G01S 7/497; G01S 17/89
See application file for complete search history.

(56) References Cited

U.S. PATENT DOCUMENTS 5,815,251 A    9/1998   Ehbets et al.
10,746,855 B2  8/2020   Qiu et al.
(Continued)

FOREIGN PATENT DOCUMENTS

CN    107153182 A    9/2017
GB      2432707 A    5/2007
WO   2018121009 A1   7/2018

OTHER PUBLICATIONS

EP Search Report in Application No. 20 20 4389 dated Mar. 25, 2021.
(Continued)

*Primary Examiner* — Isam A Alsomiri
*Assistant Examiner* — Joseph C Fritchman
(74) *Attorney, Agent, or Firm* — Maschoff Brennan

(57) ABSTRACT

An absolute distance measuring method and device including a transmission unit having a laser array comprising multiple measurement laser emitters arranged along a laser array axis and a receiver unit having at least one receiver array comprising multiple measurement receivers arranged along a receiver array axis for measuring of an absolute distance based on a respective detected transmission beam and the principle of time-of-flight. The laser array comprises at least a first reference laser emitter and the receiver array comprises at least a first reference receiver. The reference laser emitter and reference receiver define an internal absolute distance reference beam path for calibration of the device with respect to said measuring of absolute distance.

10 Claims, 12 Drawing Sheets

Figure 1:
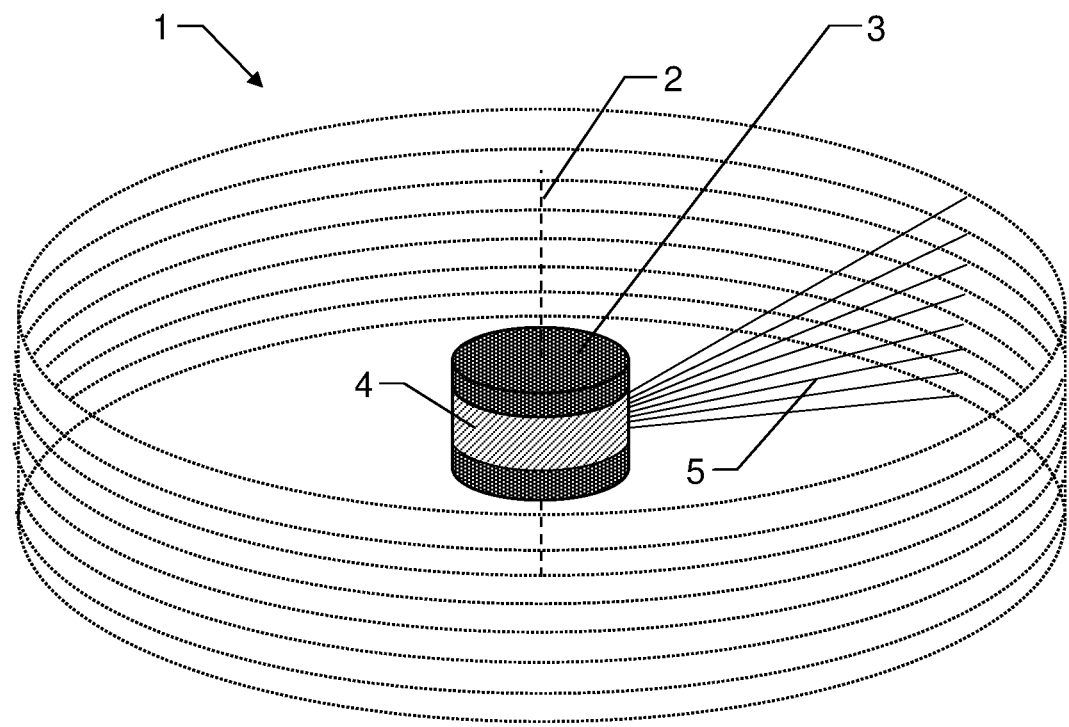

(51) Int. Cl.
  *G01S 7/4865* (2020.01)
  *G01S 7/497* (2006.01)
  *G01S 17/89* (2020.01)

(56) References Cited

U.S. PATENT DOCUMENTS

| | | | |
|---|---|---|---|
| 10,939,089 B1* | 3/2021 | Li | G01S 7/4863 |
| 2002/0018285 A1* | 2/2002 | Worner | G01S 17/42 |
| | | | 359/298 |
| 2004/0075823 A1* | 4/2004 | Lewis | G01S 7/4868 |
| | | | 356/5.01 |
| 2006/0007422 A1 | 1/2006 | Dimsdale | |
| 2015/0219764 A1* | 8/2015 | Lipson | G01S 7/4815 |
| | | | 356/4.01 |
| 2018/0059245 A1 | 3/2018 | Meinherz et al. | |
| 2018/0096489 A1* | 4/2018 | Cohen | G01S 17/894 |
| 2018/0180720 A1 | 6/2018 | Pei et al. | |
| 2018/0364334 A1 | 12/2018 | Xiang et al. | |
| 2019/0094345 A1 | 3/2019 | Singer et al. | |
| 2019/0162825 A1 | 5/2019 | Bestler et al. | |
| 2019/0235058 A1 | 8/2019 | Gimpel et al. | |
| 2020/0271765 A1* | 8/2020 | Glover | G01S 7/497 |

OTHER PUBLICATIONS

European Search Report of EP Application No. 19205917.8 dated Jul. 22, 2020.

* cited by examiner

MULTI-BEAM MEASURING DEVICE

CROSS-REFERENCE TO RELATED APPLICATIONS

This application claims priority to European Patent Application No. 19205917.8, filed on Oct. 29, 2020, European Patent Application No. 20204461.6, filed on Oct. 28, 2020, and European Patent Application No. 20204389.9, filed on Oct. 28, 2020. The foregoing patent applications are herein incorporated by reference.

FIELD OF THE INVENTION

The present invention relates to a multi-beam measurement device for object measuring by means of a plurality of transmission beams.

BACKGROUND

Such measurement devices, for example "multibeam laser profilers", may be used in the fields of mobile mapping, surveying, or autonomous driving. By way of example, the devices are mounted on vehicles, backpacks or drones, e g unmanned ground vehicles (UGVs) or unmanned aerial vehicles (UAVs), to measure the environment or to detect obstacles. Furthermore, the measurement devices may be used in a static assembly, e.g. to monitor certain areas (surveillance) or to measure, detect, count or classify objects moving past the measuring device, such as workpieces on a conveyor belt or motor vehicles on the highway.

Measuring objects or surfaces in surroundings is carried out by means of a distance measurement beam, e.g. a directional pulsed laser beam, wherein the spatial position of a surface point is determined from the measured absolute distance to the targeted surface point and angle information providing the direction of the distance measurement beam. Typical measurement devices are able to move, e.g. rotate, one or multiple distance measurement beams to different pointing directions, wherein individual measurement directions and associated absolute distances are linked with one another to generate a so-called 3D point cloud. Such 3D scanning is a very effective technology for producing millions of individual measurement points, in particular 3D coordinates, within minutes or seconds.

Often, in parallel with this purely geometric acquisition of the surface, an image recording is additionally carried out by a camera, providing not only the visual overall view but also further information, e.g. with respect to the surface texture.

Coordinative measuring such as 3D point cloud acquisition can also be carried out during a spatial movement of the measurement device, wherein the own movement of the measurement device is taken into account, e.g. by means of a global satellite positioning system (GNSS, "global navigation satellite system"), an inertial measuring system (IMU, "inertial measuring unit"), and/or by means of simultaneous position determination and mapping (SLAM, "Simultaneous Localization and Mapping").

Various principles and methods are known in the field of electro-optical distance measurement. One approach consists in emitting pulsed electromagnetic radiation, such as e.g. laser light, at a target to be measured and subsequently receiving an echo from said target as backscattering object, wherein the absolute distance to the target to be measured can be determined on the basis of the time of flight. Such laser absolute distance measuring devices have in the meantime gained acceptance as standard solutions in many fields.

Multi-beam measurement devices have various advantages, e.g. the provision of a higher point rate or a higher point density even with a slower rotational speed of a transmitter unit, no need of mechanical beam deflection, and the provision of a homogenous point distribution at the measurement object. However, individual partial beams of jointly emitted laser beams have to be aligned with corresponding reception regions.

Furthermore, interfering crosstalks can occur between individual reception beams, wherein a specific reception region corresponding to a first beam detects light of a second beam emitted near the first beam. As a result, the distance measurement accuracy is limited. In order to reduce or avoid crosstalks, various measures are known, e.g. reducing the scanning density, beam masking, e.g. by means of the use of LCDs, or complicated optical arrangements in order to precisely align a plurality of emitter-detector pairings.

In the prior art, the high (e.g. vertical) number of measuring points (laser spots) is achieved by a discrete arrangement of individual electronic boards or transmitter modules. In this case, a single laser transmitter is placed on its own board with associated control electronics. The high number of points is achieved by arranging several such boards. On the receiver side, the same effort is required by arranging a single photodetector, e.g. an avalanche photodiode (APD) or a silicon photomultiplier (SiPM) with a corresponding readout electronics on a circuit board and arranging a corresponding number of such boards to achieve the high point resolution. This is difficult to produce, limited in possible spatial resolutions and also expensive, wherein it is particularly difficult to generate with high accuracy a uniform beam distribution.

Another problem is that electro-optic distance measurement always needs some means to measure, correct or calibrate measurement errors such as the drift of the optoelectronics for example due to temperature influences.

BRIEF DESCRIPTION

Therefore, it is an object of some aspects of the present invention to provide an improved multi-beam measurement device for absolute distance measuring which overcomes the deficiencies of the prior art.

In particular, it is an object of some aspects of the present invention to provide a measurement device for generating a 3D point cloud of the environment in a more efficient and more accurate fashion.

At least parts of these objects are achieved by realizing the features of the independent claims. Features which further develop the invention in an alternative or advantageous manner are described in the dependent patent claims.

Some aspects of the invention relate to an absolute distance measuring device comprising a transmission unit having at least one laser array embodied as a laser bar or semiconductor laser array or array of single lasers on a common electronic board or submount, the laser array comprising multiple measurement laser emitters arranged along a emitter array axis and configured to generate a beam pattern and having a beam exit area. The transmission unit is configured to emit a plurality of transmission beams via the beam exit area at different measurement angles. The device comprises further a receiver unit having a measurement beam entry area and at least one receiver array comprising multiple measurement receivers arranged along a receiver array axis. Receiver array is to be understood as a receiver bar or semiconductor array or an array of receivers on a common electronic board. The beam exit area and beam entry area can be identical which is commonly referred to as "coaxial design". The receiver unit is designed for beam detection by a respective measurement receiver of at least one transmission beam of the plurality of transmission beams returning via the beam entry area and for measuring of an absolute distance based on a respective detected transmission beam and the principle of time-of-flight.

The emitter array comprises at least a first reference laser emitter and the receiver array comprises at least a first reference receiver. The reference laser emitter and reference receiver define an internal absolute distance reference beam path of defined length for calibration of the device with respect to said measuring of absolute distance.

That is, for example, one defined laser emitter of the laser array is the reference laser emitter and its defined (optical) distance along a defined beam path to a defined receiver of the receiver array is the reference beam path, the measurement of which allows for calibration of absolute distance measurement. The internal optical reference path can have a known, e.g. temperature controlled, path length. In particular in case of semiconductor arrays, using one emitter resp. receiver of a respective array can be sufficient as all emitters resp. receivers of the array show in principle equal performance.

Preferably, one of the measurement emitters serves as first reference emitter and/or one of the measurement receivers serves as first reference receiver. Said otherwise, there is dual use, for target measuring as well as for calibration, of at least one emitter resp. receiver of a respective array.

In an embodiment, the device comprises an optical guiding or deflection element such as a light fiber or mirror for guiding a reference beam from the first reference emitter of the emitter array to the first reference receiver of the receiver array such that the first absolute distance reference beam path is defined in between the first reference emitter of the emitter array and the first reference receiver of the receiver array.

Optionally, the first reference emitter is offset from the laser emitters along the laser array axis by a distance more than a pitch of respective laser emitters, for instance by permanent or temporary deactivation of a number of emitters next to the reference emitter along the laser array axis. This separation of the reference emitter from the measurement emitters is useful for minimalizing or complete suppression of crosstalk. As an additional or alternative option, the first reference receiver is offset from the measurement receivers along the receiver array axis by a distance more than a pitch of respective receivers, in particular by permanent or temporary deactivation of a number of receivers next to the reference receiver along the receiver array axis.

In a specific embodiment, the device comprises a second reference emitter in addition to and separate from the emitter array and/or a second reference receiver in addition to and separate from the receiver array. Preferably, in this embodiment, the internal absolute distance reference beam path is subdivided into a first (absolute) distance reference beam path defined between the first reference emitter and the second reference receiver, a second absolute distance reference beam path defined between the second reference emitter and the second reference receiver and a third absolute distance reference beam path defined between the second reference emitter and the first reference receiver.

Optionally, all emitters of the emitter array serve as reference emitters and all receivers of the receiver array serve as reference receivers, whereby the device comprises at least one optical guiding or deflection element such as a beam splitter for guiding part of the laser light of at least one laser emitter, preferably laser light of all laser emitters, of the emitter array to the second reference receiver and/or at least one optical guiding or deflection element for guiding laser light of the second reference emitter directly to at least one receiver of the receiver array, preferably to all receivers, and/or at least one optical guiding or deflection element for guiding laser light of the second reference emitter directly to the second reference receiver.

In some further developed embodiments, the optical guiding or deflection element for guiding laser light of all laser emitters directly to the second reference receiver is situated in an area where the beams of all laser emitters are mixed. This is e.g. particularly advantageous when using an optical fiber or beam splitter in the reference beam path as otherwise every single beam would need its own guiding element.

Optionally, the device comprises a variable optical attenuator situated in the at least one reference beam path. Thus, the attenuation of the reference laser light can be adjusted, e.g. dependent on the chosen reference receiver or for calibration with respect to the so called range walk, i.e. the distance value measured differs from the true distance value dependent on the intensity of the received laser light. By measuring the reference beam path with different attenuation settings and therefore with different intensities of received reference laser light, this range walk can be calibrated.

In another embodiment, the transmission unit is configured to generate the beam pattern by sequential activation of the laser emitters.

Optionally, the transmission unit comprises multiple of said emitter arrays, preferably seamlessly arranged, and/or the receiver unit comprises multiple, of said receiver arrays, preferably seamlessly arranged. Thereby, each of the laser arrays can comprise its own reference emitter and/or each of the receiver arrays can comprise its own reference receiver.

As another preferred option, the device comprises a base, a rotating member comprising the transmission unit and the receiver unit, the rotating member being rotatable relative to the base about an axis of rotation and configured to rotate the beam exit area of the transmission unit and the beam entry area of the receiver unit about the axis of rotation, an angle determining unit configured to determine angular data relating to the angular orientation of the rotating member about the axis of rotation, and a computing unit configured to derive three-dimensional point cloud data by combining the angle data, the distance measurement data, and stored directional data providing the beam direction of each of the plurality of transmission beams relative to the rotating member.

As another option, the measurement device is designed for the three-dimensional geometric capture of an environment and comprises a base and a rotating member comprising a transmission unit and a receiver unit, the rotating member being rotatable relative to the base about an axis of rotation and configured to rotate a beam exit area of the transmission unit and a beam entry area of the receiver unit about the axis of rotation, wherein the device further comprises an angle determining unit configured to determine angular data relating to the angular orientation of the rotating member about the axis of rotation. For example, the rotating member rotates with a frequency between 5 or 10 Hz to 200 Hz. The transmission unit is configured to emit a plurality of transmission beams via the beam exit area, wherein transmission beams of the plurality of transmission beams are respectively emitted at different elevation angles with respect to the axis of rotation. The receiver unit is configured to detect transmission beams returning via the beam entry area and to generate distance measurement data relating to the plurality of transmission beams. Furthermore, the measurement device comprises a computing unit configured to derive three-dimensional point cloud data by combining the angle data, the distance measurement data, and stored directional data providing the beam direction of each of the plurality of transmission beams relative to the rotating member.

Optionally, the receiving unit comprises multiple receiver arrays arranged on separate array packages, wherein each receiver array comprises multiple receiving surfaces arranged along a respective receiver array axis for separately capturing individual transmission beams. In other words, the individual receiving surfaces of their respective receiver array are tightly packed next to each other such that they define an oblong shape of the respective receiver array, which has an oblong extension along the respective receiver array axis. On both axial ends of the receiver array, measured along the respective receiver array axis, the extension of the receiver surface free array package area, e.g. comprising a receiver submount, is longer than the gaps between adjoining receiving surfaces within the respective receiver array, wherein the separate array packages are shifted from another and/or rotated with respect to each other such that the receiving surfaces are arranged in an oblong receiver section, wherein, measured along a longitudinal axis of the oblong receiver section, the receiving surfaces are arranged in a seamless fashion, namely, measured along the longitudinal axis of the receiver section, the gaps between adjoining receiving surfaces within the oblong receiver section are less than or equal to the gaps between receiving surfaces that belong to the same receiver array.

The advantage of using such an array arrangement is, in addition to the high mechanical precision, the achievable small distance between the receiving surfaces providing for a corresponding high scan point density (small angular difference) while at the same time a seamless scan pattern is provided. However, such arrays cannot be arbitrarily stitched together, because at both ends of the array arrangement additional space is required for the package (housing), the electronics, or for sawing the electronics chip. Therefore, sequencing several such arrays inevitably leads to gaps in the scan pattern (unsampled areas).

For example, the separate receiver packages are shifted from another and/or rotated with respect to each other, e.g. wherein the packages have a horizontal offset to each other, such that at least in one direction the arrays can be stacked without additional spacing (the resulting parallax or different angle in the object space compared to a purely linear alignment in the other, e.g. the horizontal, direction is negligible or compensated through the rotation of the device). For example, this provides for reduced manufacturing and set-up costs because only the complete arrays need to be aligned, rather than every single emitter.

In one embodiment, at least two of the receiver array axes are aligned parallel to each other, e.g. wherein the parallel axes are parallel to the longitudinal axis of the oblong receiver section, more particularly wherein the longitudinal axis of the oblong receiver section is parallel to the axis of rotation. Thus, in case the axis of rotation is vertical, the receiver array axes are horizontally offset to each other.

By way of example, the receiver arrays are embodied as avalanche photodiode (APD) or silicon photomultiplier (SiPM) arrays, in which a plurality of detection elements are produced from a monolithic silicon block. The photolithographic processes used in semiconductor fabrication allow APD arrays or SiPM arrays to be manufactured with a high reproducible accuracy with respect to the spacing of the components from each other (e.g. 100 µm, 250 µm, 500 µm). However, the number of elements of an array is limited. Typically, the higher the number of elements (APD's or SiPM) on an array, the smaller the yield of optimally functioning arrays. Consequently, since at both ends of the array arrangement additional space is required for the package (housing), the electronics, or for sawing the electronics chip, sequencing several such arrays inevitably leads to gaps.

In a further embodiment, the detector arrays are embodied as avalanche photodiode arrays, each avalanche photodiode representing one of the multiple receiving surfaces. Alternatively, each receiver array is based on a sensor configured to provide different, e.g. pre-defined selectable or dynamically settable, acquisition regions on the same detection surface, such that the different acquisition regions are used as different receiving surfaces.

In a further embodiment, the receiver unit comprises an objective lens, which is shared by the multiple receiver arrays. Alternatively, each of the receiver arrays comprises its own objective lens.

While on the receiver side a seamless arrangement of receiver arrays, i.e. a seamless arrangement (in one direction, namely the longitudinal direction of the oblong receiver section) of the receiving surfaces, is required, on the transmission side different approaches are possible when using an arrangement of laser arrays to provide a so-called seamless scan pattern, i.e. a scan pattern wherein in one direction, e.g. the vertical direction, the scan points are distributed with no gaps caused by the additional space required for the packaging of the laser arrays.

In a further embodiment, the transmission unit comprises multiple laser arrays, each laser array being associated to one of the multiple receiver arrays (or to a set of receiver arrays) and comprising multiple laser emitters arranged along a respective laser array axis, wherein the transmission unit is configured that transmission beams generated by respective laser arrays are detected by the receiver surfaces of their associated receiver array.

In particular, the transmission unit is configured that, based on each laser array, a corresponding set of transmission beams is generated, wherein the angular difference in elevation angle of adjacent transmission beams within a respective set of transmission beams is less than or equal to a maximum angular difference, wherein the combination of the sets of transmission beams of two laser arrays forms an arrangement of transmission beams, wherein the angular difference in elevation angle of adjacent transmission beams within the arrangement of transmission beams is less than or equal to the maximum angular difference (associated to an individual set of transmission beams).

By way of example, the laser array comprises multiple laser emitters made from a monolithic semiconductor block allowing to produce arrays with high reproducible accuracy with respect to the gap between emitters (e.g. 100 µm, 250 µm, 500 µm). However, similar to the problem of receiver arrays described above, the number of emitters on such an array is typically limited, e.g. wherein the higher the number of emitters, the smaller the yield of optimally functioning arrays. For example, currently laser arrays typically have eight emitters. Therefore, multiple such laser arrays are necessary to reach a high point density or resolution, respectively.

The advantage of using such an array arrangement is, in addition to the high mechanical precision, the achievable small spacing between the emitters providing for a corresponding high scan point density (small angular difference).

However, such arrays cannot be arbitrarily stitched together, because at both ends of the array arrangement additional space is required for the package (housing), the electronics, or for sawing the electronics chip. Therefore, sequencing several such arrays inevitably leads to gaps in the scan pattern (unsampled areas).

One possibility to combine several such array arrangements and at the same time providing a so-called seamless scan pattern is to use an optical beam splitting component such as a diffractive optical element (DOE) or refractive optical element (ROE), configured to split an incoming beam into a defined number of outgoing beams having well-defined angular separations with respect to each other, wherein the gap is "filled" by the multiplication of the beams by the-DOE or ROE.

As a result of this filling in of the gaps between the laser arrays by the multiplication of the beams of individual laser emitters with the DOE or ROE, a seamless arrangement is not necessary on the transmitter side. However, in case no optical beam splitting component is used, a seamless arrangement of the laser arrays may be used in a similar fashion as described above for the receiver side.

Therefore, in a further embodiment, the transmission unit comprises an optical beam splitting component arranged in the optical path associated to at least part of the multiple laser arrays and configured to split an incoming beam generated by a respective laser emitter into a defined number of outgoing beams having well-defined angular separations with respect to each other, e.g. wherein the optical beam splitting component comprises at least one of a diffractive or refractive optical element, a diffraction grating, e.g. a Dammann grating, and a holographic optical element.

For example, a diffraction grating may be used such that for each individual laser beam passing through the grating the first four diffraction maxima will generate four beams emitted at well-defined angles.

In another embodiment, the multiple laser arrays are arranged on separate array packages, which are shifted from another and/or rotated with respect to each other such that the laser emitters are arranged in an oblong emitter section, wherein, measured along a longitudinal axis of the oblong emitter section, the laser emitters are arranged in a seamless fashion, namely, measured along the longitudinal axis of the emitter section, the gaps between adjoining laser emitters within the oblong emitter section are less than or equal to the gaps between laser emitters that belong to the same laser array.

For example, the packages have a horizontal offset to each other, such that at least in one direction the arrays can be stacked without additional spacing (the resulting parallax or respectively different angle in the object space compared to a purely linear alignment in the other, e.g. the horizontal, direction is negligible or compensated through the rotation of the device). For example, this provides for reduced manufacturing and set-up costs because only the complete arrays need to be aligned, rather than every single emitter.

In a further embodiment, the transmission unit comprises an objective lens, which is shared by the multiple laser arrays, e.g. wherein the transmission unit is configured to provide an elevation field of view of at least 10°. Alternatively, each laser array comprises its own objective lens, e.g. wherein the transmission unit is configured to provide an elevation field of view of at least 10° or 40°.

In a further embodiment, the receiver unit and/or the transmission unit comprises a zoom component configured to compensate a focal length mismatch between the receiver unit and the transmission unit, e.g. to adjust focal length tolerances of the receiver unit relative to focal length tolerances of the transmission unit relating to the optical beam splitting component. For example, the focal length manufacturing tolerances of the transmission unit have to match with angles of the optical beam splitting component and the pitch of the laser arrays.

In a further embodiment, the laser arrays and/or the receiver arrays are arranged along respective arcs defined by the image field curvature caused by the transmitting optics or the receiving optics, respectively. By way of example, the arrays are assigned to different tangents of the corresponding arc and respective receiver array axes or respective laser array axes are arranged parallel their assigned tangents.

In particular, each laser array may be configured that its laser emitters are individually controlled, particularly wherein the transmission unit is configured that each laser array is controlled by its own laser pulser or one laser pulser can be switched between the laser emitters.

In a further embodiment, the measurement device is configured that in each of the multiple laser arrays the respective laser emitters are sequentially activated, and in each of the multiple laser arrays at least two immediately adjacent laser emitters are assigned to the same receiving surface, which, for example, has a double-pinhole shaped aperture. In other words, the beams generated by the two immediately adjacent laser emitters are detected by the same receiving surface, e.g. the same avalanche photodiode. Thus, by sequencing the laser emitters the total number of different beams associated to different elevations can be larger than the number of individual receiving surfaces.

By way of example, each laser array comprises eight laser diodes, the optical beam splitting component is arranged in a common optical path section of the multiple laser arrays and configured to split a respective incoming beam into at least two, particularly at least four, outgoing beams, and each receiver array comprises eight, particularly sixteen, receiving surfaces. Thus, in case of splitting the respective incoming beam into two outgoing beams, sixteen beams are generated, each beam being associated with a different elevation, wherein the returning beams are detected by eight individual receiving surfaces, i.e. an individual receiver surface sequentially receives two sequentially emitted laser beams.

In a further embodiment, the measurement device comprises an optical component, which is shared by the transmission unit and the receiver unit. In case the shared component is a common objective, this is typically referred to as so-called coaxial design. Alternatively, all the optics of the transmission unit are separated from the optics of the receiver unit, which is also referred to as so-called biaxial design.

In particular, the (e.g. vertical) spatial resolution may optionally be increased by at least one of the following measures: at least part of the laser arrays being tilted towards the direction of rotation of the rotating member about the axis of rotation; the laser arrays being arranged with respect to each other that, measured along the longitudinal axis of the oblong emitter section, the laser emitters of two different laser arrays are arranged in an interleaving fashion; the receiver arrays being arranged with respect to each other that, measured along the longitudinal axis of the oblong receiver section, the receiving surfaces of two different receiver arrays are arranged in an interleaving fashion; and at least part of the receiver arrays being tilted towards the direction of rotation of the rotating member about the axis of rotation.

Furthermore, optical components may be arranged in the optical transmission and/or reception path to correct influences such as beam deflection, blur, and/or aberration of a lighthouse encasing the transmission unit and the receiver unit.

Optionally, the transmission unit comprises multiple semiconductor lasers arrays, each semiconductor laser array comprising multiple laser emitters made from a monolithic block, e.g. a monolithic silicon block, and arranged along a respective laser array axis.

Such laser arrays, e.g. so-called laser bars, allow to produce laser arrays with high reproducible accuracy with respect to the gap between emitters (e.g. 100 µm, 250 µm, 500 µm). The center-to-center distance between two adjacent emitters of the same semiconductor laser array is called (emitter) pitch. For example, in one embodiment, the pitch between adjoining laser emitters of the same semiconductor laser array is at most 500 µm.

On both axial ends of each of the semiconductor laser arrays, with respect to the respective laser array axis, the extension of the emitter-free area is longer than half the pitch between adjoining laser emitters. For example, at both ends of such a semiconductor laser array additional space is required for the package (housing), the electronics, or for sawing the electronics chip or the monolithic block of laser emitters. By way of example, when generating monolithic semiconductor laser arrays, an initial array of emitting areas made from a monolithic block with an extension up to one entire dimension of a semiconductor waver is sawed to physically separate two or more semiconductor laser arrays, wherein the sawing destroys at least one of the initial emitting areas of each sawing edge (cutting edge) of the generated laser arrays. Therefore, the unusable area of the semiconductor laser array where no emission is possible at least extends to a fraction, e.g. one half) of a single emitting laser element (emitter), typically on both axial ends of the semiconductor laser array.

By way of example, the semiconductor laser arrays are each mounted on separate laser array packages. Alternatively, the semiconductor laser arrays are mounted on a «submount» (e.g. a ceramic substrate) or even directly on a printed circuit board (PCB) without a package, i.e. wherein the so-called "bare die" (e.g. silicon) is assembled without additional individual array packaging. The gap between the individual semiconductor laser arrays then results from unusable outermost emitter elements, which have been damaged during generation of the individual laser arrays (by sawing apart an initial emitter array).

The multiple semiconductor laser arrays are arranged and configured to generate an initial beam pattern, wherein the transmission unit further comprises an optical beam splitting component. This optical beam splitting component—e.g. based on at least one of a diffractive optical element, a refractive optical element, a diffraction grating, e.g. a Dammann grating, and a holographic optical element—is arranged and configured that the initial beam pattern is split into an outgoing beam pattern, wherein the outgoing beam pattern is a multiple of the initial beam pattern generated by splitting individual beams of the initial beam pattern into multiple beams being arranged with well-defined angular separations with respect to a splitting direction, e.g. essentially corresponding to the vertical direction in the outgoing beam pattern. In combination with the optical beam splitting element (and imaging optics), the pitch between adjacent laser emitters provides (defines) a given minimal angular distance, with respect to the splitting direction, between beams in the outgoing beam pattern that originate from the same semiconductor laser array. According to this aspect of the invention, the arrangement of the multiple semiconductor laser arrays and the optical beam splitting component is adapted such that the actual angular distance between adjacent beams of the outgoing beam pattern is in each case less than or equal to the given minimal angular distance provided by the pitch.

For example, a diffraction grating may be used such that for each individual laser beam passing through the grating the first four diffraction maxima will generate four beams emitted at well-defined angles.

Thus, there is the benefit of the achievable small angular distance between transmission beams thanks to the small pitch of the semiconductor laser arrays, e.g. providing for a corresponding high scan point density, while at the same time a seamless scan pattern originating from multiple semiconductor laser arrays is provided despite the fact that additional emitter-free space is required at the axial ends of each of the semiconductor laser arrays.

Different approaches are possible when using an arrangement of semiconductor laser arrays in combination with an optical beam splitting component to provide a so-called seamless scan pattern, i.e. a scan pattern wherein in one direction, e.g. the vertical direction, the scan points are distributed with no gaps caused by the additional space required for the packaging of the semiconductor laser arrays.

For example, in one embodiment, the multiple semiconductor laser arrays are arranged with a gap between each other with respect to a direction corresponding to the splitting direction, e.g. a direction parallel to the axis of rotation. In order to provide a seamless scan pattern the optical beam splitting component, e.g. a refractive optical element or a diffractive optical element, is then configured to split an incoming beam into a defined number of outgoing beams having well-defined angular separations with respect to each other such that the gap is "filled" by the multiplication of the beams of individual laser emitters by the optical beam splitting component.

As a result of this filling the gaps between the laser emitters of different semiconductor laser arrays by the multiplication of the beams of individual laser emitters, a seamless arrangement of the laser emitters is not necessary on the transmitter side.

For example, the optical beam splitting component is configured to split the individual beams of the initial beam pattern such that, with respect to the splitting direction, in the outgoing beam pattern axial ends of transmission beams originating from the same semiconductor laser array adjoin or overlap (axial ends of "copies" of the complete bundle of beams of the same semiconductor laser array adjoin or overlap), and that the transmission beams in the outgoing beam pattern that originate from a first semiconductor laser array adjoin or overlap an axial end of the transmission beams that originate from a second semiconductor laser array arranged next to the first semiconductor laser array with respect to a direction corresponding to the splitting direction (axial ends of "copies" of the complete bundle of beams of two different semiconductor laser arrays adjoin or overlap).

For example with an array of eight laser emitters with a pitch of 500 µm and a focal length of the imaging optics of 70 mm, the angle between the emitted laser beams corresponds to $\Phi = a \tan (500\ \mu m/70\ mm) = 0.4°$. Therefore the eight laser beams of such a single eight-time laser array cover an angular field of view (FoV) of $8 \times 0.4° = 3.2°$.

By using two such eight-time laser arrays, each laser array having a field of view of 3.2°, and by using a diffractive optical element (DOE) as beam splitting component with a multiplication factor of two (which means that one input beam results in two output beams), and an angular separation of the two beams of 3.2° (chosen by design of the DOE to correspond to the field of view of the eight-time laser array), the two laser arrays can have a gap between each other of up to 8×500 µm=4 mm (corresponding to the 8×0.4°) in order to generate a resulting seamless beam pattern without any gaps.

For example using two laser arrays, each laser array having eight laser emitters, and a DOE with a multiplication factor of two, the resulting beam pattern has 2×2×8=32 beams and covers a field of view of a tan (500 µm/70 mm)×8×2×2=12.8°.

Another approach is to use a seamless arrangement of the laser emitters of different semiconductor laser arrays, wherein the semiconductor laser arrays are shifted from another and/or rotated with respect to each other such that, with respect to the direction corresponding to the splitting direction, the center-to-center gaps between adjoining laser emitters of different semiconductor laser arrays are less than or equal to the pitch between laser emitters corresponding to the same semiconductor laser array.

For example, the semiconductor laser arrays have a horizontal offset to each other, such that at least in one direction the arrays can be stacked without additional spacing (the resulting parallax or respectively different angle in the object space compared to a purely linear alignment in the other, e.g. the horizontal, direction is negligible or compensated through the rotation of the device). For example, this provides for reduced manufacturing and set-up costs because only the complete arrays need to be aligned, rather than every single emitter.

Compared to the previously described embodiment, this embodiment of seamlessly arranged laser emitters may be implemented with the beam splitting component generating larger beam splitting angles, e.g. wherein the complete bundle of beams of all the semiconductor laser arrays is "copied" such that, with respect to the splitting direction, axial ends of copies of the complete bundle adjoin each other.

Alternatively, this embodiment could be implemented to increase the point density to a resolution which is denser than the resolution provided by the pitch, e.g. wherein the optical beam splitting component is configured to split the individual beams of the initial beam pattern such that, in the outgoing beam pattern the minimal angular distance between beams originating from the same emitter is less than the given minimal angular distance provided by the pitch.

The approach described above of using a seamless arrangement of the laser emitters of different semiconductor laser arrays may also be implemented without the use of a beam splitting component. Also this alternative benefits from the achievable small angular distance between transmission beams thanks to the small pitch of the semiconductor laser arrays while at the same time a seamless scan pattern originating from multiple semiconductor laser arrays is provided, despite the fact that additional emitter-free space is required at the axial ends of each of the semiconductor laser arrays.

Thus, in another embodiment, a measurement device for the three-dimensional geometric capture of an environment comprises a base and a rotating member comprising a transmission unit and a receiver unit, the rotating member being rotatable relative to the base about an axis of rotation and configured to rotate a beam exit area of the transmission unit and a beam entry area of the receiver unit about the axis of rotation, wherein the device further comprises an angle determining unit configured to determine angular data relating to the angular orientation of the rotating member about the axis of rotation. The transmission unit is configured to emit a plurality of transmission beams via the beam exit area, wherein transmission beams of the plurality of transmission beams are respectively emitted at different elevation angles with respect to the axis of rotation. The receiver unit is configured to detect transmission beams returning via the beam entry area and to generate distance measurement data relating to the plurality of transmission beams. Furthermore, the measurement device comprises a computing unit configured to derive three-dimensional point cloud data by combining the angle data, the distance measurement data, and stored directional data providing the beam direction of each of the plurality of transmission beams relative to the rotating member.

In this embodiment, the transmission unit comprises multiple semiconductor lasers arrays, each semiconductor laser array comprising multiple laser emitters made from a monolithic block, e.g. a monolithic silicon block, and arranged along a respective laser array axis. On both axial ends of each of the semiconductor laser arrays, with respect to the respective laser array axis, the extension of the emitter-free area is longer than half the pitch between adjoining laser emitters. For example, at both ends of such a semiconductor laser array additional space is required for the package (housing), the electronics, or for sawing the electronics chip or the monolithic block of laser emitters to generate the semiconductor laser array (see above).

The separate semiconductor laser arrays are shifted from another and/or rotated with respect to each other such that the multiple laser emitters of the multiple semiconductor laser arrays are arranged in an oblong arrangement section. With respect to a longitudinal direction of the oblong arrangement section, the center-to-center gap between adjoining laser emitters of different semiconductor laser arrays is less than or equal to the pitch between laser emitters corresponding to the same semiconductor laser array. An outgoing beam pattern is generated, wherein the angular distance between adjacent beams of the outgoing beam pattern is in each case less than or equal to a given minimal angular distance, with respect to a direction corresponding to the longitudinal direction of the oblong arrangement section, provided (defined) by the pitch between beams in the outgoing beam pattern that originate from the same semiconductor laser array.

Unless stated otherwise, the following embodiments relate to a measuring device with or without a beam splitting component.

In one embodiment, each semiconductor laser array is configured that its laser emitters are individually controlled, particularly wherein the transmission unit is configured that each emitter is controlled by its own laser pulser or each emitter is sequentially connected to a common laser driver, e.g. by means of a multiplexer.

In a further embodiment, the receiver unit comprises a receiver array having multiple receiving surfaces arranged along a respective receiver array axis for separately capturing individual transmission beams. Furthermore, the measurement device is configured that in each of the multiple semiconductor laser arrays the respective laser emitters are sequentially activated and in each of the multiple semiconductor laser arrays at least two immediately adjacent laser emitters are assigned to the same receiving surface. Thus, the measurement device is configured that the beams generated by the at least two immediately adjacent laser emitters are detected by the same receiving surface, e.g. the same avalanche photodiode. For example, e.g. for optimizing the signal to noise ratio, the receiving surfaces have a double-keyhole shaped aperture. Thus, by sequencing the laser emitters the total number of transmission beams can be larger than the number of individual receiving surfaces, e.g. a multiple of the number of the individual receiving surfaces.

By way of example, each semiconductor laser array comprises eight laser diodes, the optical beam splitting component is arranged in a common optical path section of the multiple semiconductor laser arrays and configured to split a respective incoming beam into at least two, particularly at least four, outgoing beams. The receiver unit comprises a receiver array having eight, particularly sixteen, receiving surfaces arranged along a respective receiver array axis for separately capturing individual transmission beams. Thus, in case of splitting the respective incoming beam into two outgoing beams, sixteen beams are generated, each beam being associated with a different elevation, wherein the returning beams are detected by eight individual receiving surfaces, i.e. an individual receiver surface sequentially receives two sequentially emitted laser beams.

In a further embodiment, the transmission unit comprises an objective lens, which is shared by the multiple semiconductor laser arrays, wherein the transmission unit is configured to provide an elevation field of view of at least 10°. Alternatively, each semiconductor laser array comprises its own objective lens, wherein the transmission unit is configured to provide an elevation field of view of at least 10° or 40°.

In a further embodiment, the measurement device comprises a zoom component configured to compensate a focal length mismatch between the receiver unit and the transmission unit, e.g. to adjust focal length tolerances of the receiver unit relative to focal length tolerances of the transmission unit relating to the optical beam splitting component. For example, the focal length manufacturing tolerances of the transmission unit have to match with angles of the optical beam splitting component and the pitch between the lasers of the laser arrays.

In a further embodiment, the semiconductor laser arrays are arranged along respective arcs defined by the image field curvature caused by the transmitting optics. By way of example, the semiconductor laser arrays are assigned to different tangents of the corresponding arc and respective laser array axes are arranged parallel to their assigned tangents.

Similarly, the receiving surfaces may be arranged along respective arcs defined by the image field curvature caused by receiver optics, e.g. a receiving objective lens.

The measurement device may be configured in a so-called coaxial design, wherein the measurement device comprises an optical component, which is shared by the transmission unit and the receiver unit, particularly a common objective lens for both the transmission and the receiver unit. Alternatively, all the optics of the transmission unit are separated from the optics of the receiver unit, which is also referred to as so-called biaxial design.

In an embodiment, the measurement device comprises an internal optical reference path for calibration of an absolute distance measurement by the computing unit, e.g. the internal optical reference path having a known, e.g. temperature controlled, path length, or the variation of the path length is negligible compared to the required measurement accuracy. A laser emitter at one of the axial ends, with respect to the corresponding laser array axis, of one of the multiple semiconductor laser arrays may then be configured to provide a reference laser beam to the internal optical reference path.

By way of example, the laser emitters arranged at the axial ends of the complete bundle of laser emitters of all of the semiconductor laser arrays, with respect to a direction corresponding to the splitting direction or along the longitudinal direction of the oblong arrangement section, are used. By choosing such marginal rays, the seamless manner of the spatial or angular spacing of the measurement beams is not interrupted. In other words, the multiple semiconductor laser arrays are arranged that the laser emitters are arranged in an elongated distribution, e.g. in a direction corresponding to the splitting direction or along the longitudinal direction of the oblong arrangement section, and a laser emitter at one of the axial ends (of the complete beam bundle generated by the different semiconductor laser arrays) with respect to a longitudinal axis of the elongated distribution is configured to provide the reference laser beam to the internal optical reference path.

Another approach, e.g. when using an optical beam splitting component, is to use so-called inner laser emitters, e.g. which lie closer to the optical axis of the transmission optics. This may provide benefits regarding packaging and arrangement of the optical reference path, e.g. in case the reference path is temperature controlled.

In a further embodiment, the multiple semiconductor laser arrays are arranged with a gap between each other with respect to an arrangement direction corresponding to the splitting direction, wherein the multiple semiconductor lasers arrays are arranged that the laser emitters are distributed along the arrangement direction. Furthermore, the laser emitter providing the reference laser beam to the internal optical reference path is arranged at the axial end towards the gap. For example, the laser emitter providing the reference laser beam is offset from the rest of the laser emitters of the same semiconductor laser array by a distance of more than the pitch of the rest of the laser emitters.

In a further embodiment, the receiver unit comprises a receiver array, a plurality of amplifiers, e.g. transimpedance amplifiers, a selector, e.g. comprising a multiplexer circuit, and a signal analyzer, e.g. comprising an analog-to-digital circuit, particularly a multi-channel analog-to-digital circuit or a time-to-digital converter (TDC). The receiver array has a plurality of receiving surfaces arranged along a respective receiver array axis for separately capturing individual transmission beams of the outgoing beam pattern, particularly wherein each of the transmission beams of the outgoing beam pattern is uniquely assigned to one of the receiving surfaces, e.g. by a one-to-one assignment of individual transmission beams to individual receiving surfaces. Each amplifier of the plurality of amplifiers is connected to several, particularly adjacent, receiving surfaces of the plurality of receiving surfaces and the plurality of amplifiers is connected to the analyzer via the selector.

Having such a seamless outgoing beam pattern along the splitting direction may further require to have a corresponding seamless arrangement of receiving surfaces, i.e. a seamless arrangement in a direction corresponding to the received splitting direction.

For example, the detector arrays are embodied as avalanche photodiode arrays or silicone photomultiplier (SiPM), each detector representing one of the multiple receiving surfaces. Alternatively, each receiver array is based on a sensor configured to provide different, e.g. pre-defined selectable or dynamically settable, acquisition regions on the same detection surface, such that the different acquisition regions are used as different receiving surfaces.

The advantage of using such an array arrangement is, in addition to the high mechanical precision, the achievable small distance between the receiving surfaces providing for a corresponding high scan point density (small angular difference) while at the same time a seamless scan pattern is provided. For example, the receiver arrays are shifted from another and/or rotated with respect to each other, e.g. wherein the arrays have a horizontal offset to each other, such that at least in one direction the arrays can be stacked without additional spacing (the resulting parallax or different angle in the object space compared to a purely linear alignment in the other, e.g. the horizontal, direction is negligible or compensated through the rotation of the device). For example, this provides for reduced manufacturing and set-up costs because only the complete arrays need to be aligned, rather than every single emitter.

By way of example, the receiver arrays are embodied as avalanche photodiode (APD) or silicon photomultiplier (SiPM) arrays, in which a plurality of detection elements are produced from a monolithic silicon block. The photolithographic processes used in semiconductor fabrication allow APD arrays or SiPM arrays to be manufactured with a high reproducible accuracy with respect to the spacing of the components from each other (e.g. 100 µm, 250 µm, 500 µm). However, the number of elements of an array is limited. Typically, the higher the number of elements (APD's or SiPM) on an array, the smaller the yield of optimally functioning arrays. Consequently, similarly to the case of the semiconductor laser arrays having multiple laser emitters made from a monolithic silicon block, since at both ends of the array arrangement additional space is required for the package (housing), the electronics, or for sawing the electronics chip, sequencing several such arrays inevitably leads to gaps.

For example, the detector arrays are embodied as avalanche photodiode arrays, each avalanche photodiode representing one of the multiple receiving surfaces. Alternatively, each receiver array is based on a sensor configured to provide different, e.g. pre-defined selectable or dynamically settable, acquisition regions on the same detection surface, such that the different acquisition regions are used as different receiving surfaces.

In a further aspect of some aspects of the invention, the receiver unit comprises multiple receiver arrays, e.g. arranged on separate arrays, wherein each receiver array comprises multiple receiving surfaces arranged along a respective receiver array axis for separately capturing individual transmission beams. In other words, the individual receiving surfaces of their respective receiver array are tightly packed next to each other such that they define an oblong shape of the respective receiver array, which has an oblong extension along the respective receiver array axis. On both axial ends of the receiver array with respect to the respective receiver array axis, the extension of the receiver-surface-free area, e.g. comprising a receiver submount, is longer than the gaps between adjoining receiving surfaces within the respective receiver array. In order to provide a seamless arrangement of the receiving surfaces of different receiver arrays with respect to a direction corresponding to the splitting direction or the longitudinal direction of the oblong arrangement section, the receiver arrays are shifted from another and/or rotated with respect to each other such that the receiving surfaces are arranged in an oblong receiver section, wherein, with respect to a longitudinal axis of the oblong receiver section, the receiving surfaces are arranged in a seamless fashion. In other words, along the longitudinal axis of the receiver section, the gaps between adjoining receiving surfaces within the oblong receiver section are less than or equal to the gaps between receiving surfaces that belong to the same receiver array.

The advantage of using such an array arrangement is, in addition to the high mechanical precision, the achievable small distance between the receiving surfaces providing for a corresponding high scan point density (small angular difference) while at the same time a seamless scan pattern is provided. For example, the receiver arrays are shifted from another and/or rotated with respect to each other, e.g. wherein the arrays have a horizontal offset to each other, such that at least in one direction the arrays can be stacked without additional spacing (the resulting parallax or different angle in the object space compared to a purely linear alignment in the other, e.g. the horizontal, direction is negligible or compensated through the rotation of the device). For example, this provides for reduced manufacturing and set-up costs because only the complete arrays need to be aligned, rather than every single emitter.

In one embodiment, at least two of the receiver array axes are aligned parallel to each other, e.g. wherein the parallel axes are parallel to the longitudinal axis of the oblong receiver section, more particularly wherein the longitudinal axis of the oblong receiver section is parallel to the axis of rotation. Thus, in case the axis of rotation is vertical, the receiver array axes are horizontally offset to each other.

In a further embodiment, the receiver unit comprises an objective lens, which is shared by the multiple receiver arrays. Alternatively, each of the receiver arrays comprises its own objective lens.

Furthermore, optical components may be arranged in the optical transmission and/or reception path to correct influences such as beam deflection, blur, and/or aberration of a lighthouse encasing the transmission unit and the receiver unit.

The above described semiconductor laser array arrangements, with or without the use of a beam splitting component, can further be used in a so-called static measurement device. In such a measurement device, the measurement device has—instead of the above described base, rotating member, angle determining unit, and computing unit—a (e.g. static) transmission unit and a (e.g. static) receiver unit. The transmission unit is configured to emit a plurality of transmission beams via a beam exit area, wherein transmission beams of the plurality of transmission beams are respectively emitted at different measurement angles, thereby generating a beam pattern. The receiver unit is configured to detect transmission beams returning via a beam entry area and to generate distance measurement data relating to the plurality of transmission beams.

Such a static measurement device may be used in cases where an object to be detected moves relative to the measurement device, e.g. a workpiece on a conveyor belt or vehicles on the street.

For example, the measurement device is further configured to receive motion data indicative of a motion of an object to be detected relative to the measurement device. Furthermore, the measurement device comprises a computing unit configured to derive three-dimensional point cloud data by combining the distance measurement data, stored directional data providing the beam direction of each of the plurality of transmission beams, and the motion data.

By way of another example, the measurement device comprises a computing unit configured to derive approach data of an object moving relative to the measurement device by combining the distance measurement data and stored directional data providing the beam direction of each of the plurality of transmission beams. For example, the approach data provide a real time distance and direction of the object relative to the measurement device.

In case of a rotating device, using an arrangement of laser arrays pushes data transfer between the rotating member and the base to its limits, since the measurement data are becoming more and more accurate and high-resolution. As a consequence, the data volume increases sharply. In the prior art, typically slip rings are used. However, life time of such slip rings is limited, e.g. about 100 to 500 million revolutions. Also, the maximum rotation speed is limited by the heat development on the slip ring contacts. Furthermore, transmission of the data via contacts affects the signal quality and thus the maximum data rate is limited, e.g. to about 1 Mbit per second or less. Thus, in another embodiment, the measurement device comprises a base and a rotating member comprising a transmission unit and a receiver unit. The rotating member is rotatable relative to the base about an axis of rotation and configured to rotate a beam exit area of the transmission unit and a beam entry area of the receiver unit about the axis of rotation. The measurement device further comprises an angle determining unit configured to determine angular data relating to the angular orientation of the rotating member about the axis of rotation. The transmission unit is configured to emit a plurality of transmission beams via the beam exit area, wherein transmission beams of the plurality of transmission beams are respectively emitted at different elevation angles with respect to the axis of rotation, wherein the receiver unit configured to detect transmission beams returning via the beam entry area and to generate distance measurement data relating to the plurality of transmission beams. The measurement device also comprises an optical data transmission unit configured to provide wireless data exchange between the base and the rotating member by means of an optical signal, an inductive power exchange unit comprising a power transmitter on the base and a power receiver on the rotating member configured to provide power exchange between the base and the rotating member, and a computing unit configured to derive three-dimensional point cloud data by combining the angle data, the distance measurement data, and stored directional data providing the beam direction of each of the plurality of transmission beams relative to the rotating member.

According to this embodiment, the base comprises a hollow shaft defining the axis of rotation, the hollow shaft extending along the axis of rotation into the rotating member, and the optical data transmission unit comprises a data transmitter being mounted to the rotating member at one distal end of the shaft and a data receiver being mounted to the base at the other distal end of the shaft, wherein the data transmitter and receiver are configured and arranged to exchange data by an optical signal propagating in the inside of the hollow shaft in a free-beam manner. Furthermore, the power transmitter and the power receiver of the inductive power exchange unit are arranged about the hollow shaft in an area axially displaced from the data transmitter and receiver.

In one embodiment, the data transmitter and the data receiver are configured as two data transceivers providing bi-directional data exchange, particularly wherein the two data transceivers are configured to simultaneously send and receive data via the optical signal.

In a further embodiment, the measurement device is configured to transmit a signal indicative of an actual power consumption by means of the optical signal, e.g. for the purpose of a performance optimization in the form of a control loop feedback.

This data and energy transfer provides for increased lifetime of the measurement device, e.g. wherein the lifetime is only limited by mechanical components such as bearings. In addition, much higher speeds of the rotating member are possible, e.g. between 25 Hz to 200 Hz. In addition, very high data rates are achievable, e.g. 5 Gbit/s. Furthermore, axially spatially displacing the power transmitter and the power receiver of the inductive power exchange unit from the optical data transmitter and receiver reduces mutual interferences between the transmission unit and the power exchange unit.

Some aspects of the invention also relate to a calibration method for absolute distance measuring according to the principle of time-of-flight of an absolute distance measuring device such as the inventive one described above. Within the method, a plurality of transmission beams at different measurement angles according to a beam pattern is emitted, wherein the transmission beams are emitted as sequences of distinct laser pulses with a time gap in between subsequent sequences, wherein for example the gap is adapted to a distance ambiguity range. Further, returning transmission beams of the plurality of transmission beams are received with detection of (individual) beams, and an absolute distance is measured based on the detection and the principle of time-of-flight.

Further, the absolute measuring of distance is calibrated based on at least one calibration measuring of an absolute distance of an absolute distance reference beam path of defined length using at least one laser pulse separate from the sequences of distinct laser pulses during said time gap in between subsequent sequences.

As an option, the method comprises multiple calibration measurements with different laser (pulse) intensities for range walk compensation. That is, the reference beam path is measured several times with variation of the reference light intensity, e.g. using an internal adaptable attenuator in the reference beam path.

Optionally, the internal absolute distance reference beam path is subdivided into a first, second and third absolute distance reference beam path (e.g. in devices as described above with first and second reference emitters and receivers) and the calibrating is based on a first calibration measuring of an absolute distance of the first absolute distance reference beam path during a first time gap in between subsequent sequences, a second calibration measuring of an absolute distance of the second absolute distance reference beam path of defined length during a second time gap in between subsequent sequences, and a third calibration measuring of an absolute distance of the second absolute distance reference beam path of defined length during a third time gap in between subsequent sequences.

Some aspects of the invention also relate to a computer program product comprising program code, which is stored on a machine-readable medium, or being embodied by an electromagnetic wave comprising a program code segment, and having computer-executable instructions for performing, in particular when run on a measuring device according to the invention, the calibration method according to the invention.

Some aspects of the present invention provide a multi-beam absolute measuring device with for measuring multiple object points having advantageously an internal calibration means for calibration of the absolute distance measuring. Thus, in situ calibration in the field is enabled.

Using an internal calibration path as described above, the field of view of the measuring device is not affected. For example in case of a laser rotator or the like, the full 360° FoV can be used for measuring. In preferred embodiments, calibration of all measurement beams is enabled, resulting in an even better accuracy.

In embodiments using only a (or multiple) emitter resp. receivers of the measurement laser array resp. receiver array as reference elements, no additional laser or detectors are needed. On the other hand, an additional reference emitter or reference receiver can be used for even better performance, e.g. calibration not only with respect to one beam of an array but all of it, or for convenient and precise calibration of all elements of a respective array resp. all measurement beams.

The calibration can advantageously be done parallel to or during object, e.g. measuring by using target measuring pauses as described above. These measuring pauses are for example anyhow necessary for prevention of measurement ambiguities, for performing the calibration resp. emitting and receiving a calibration beam. In particular with devices having multiple reference beam paths resp. a subdivided beam path, the calibration can be done stepwise, using successive gaps between measuring pulses.

DETAILED DESCRIPTION OF THE DRAWINGS

Figure 2:
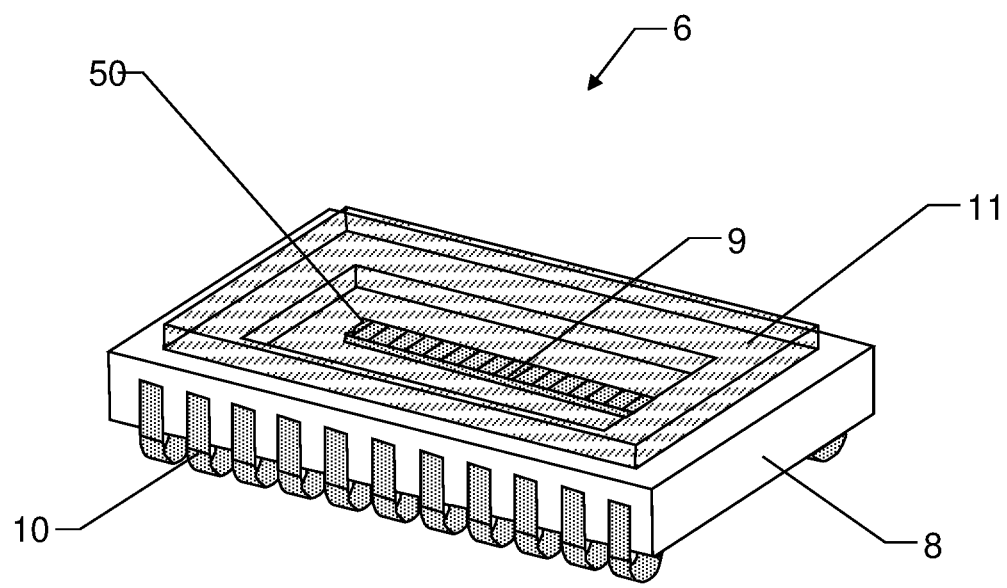
Figure 3:
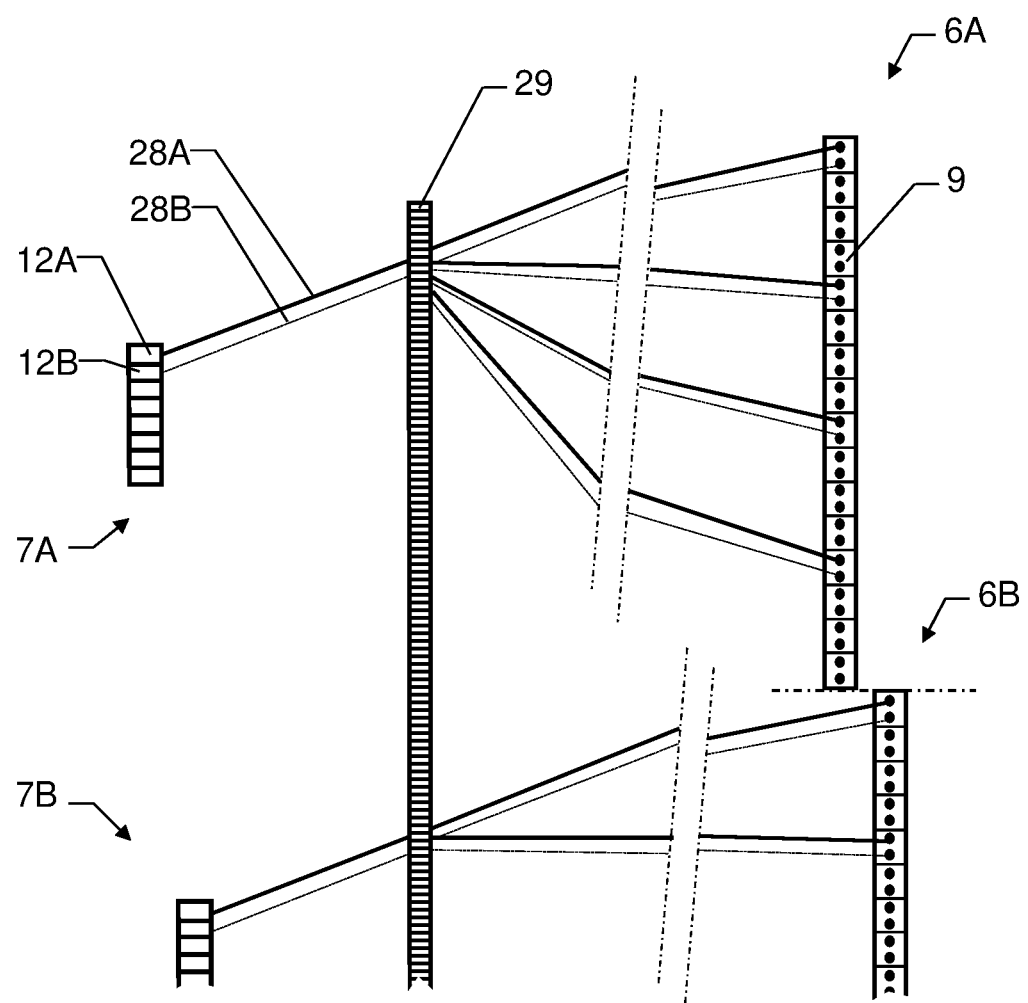
Figure 4:
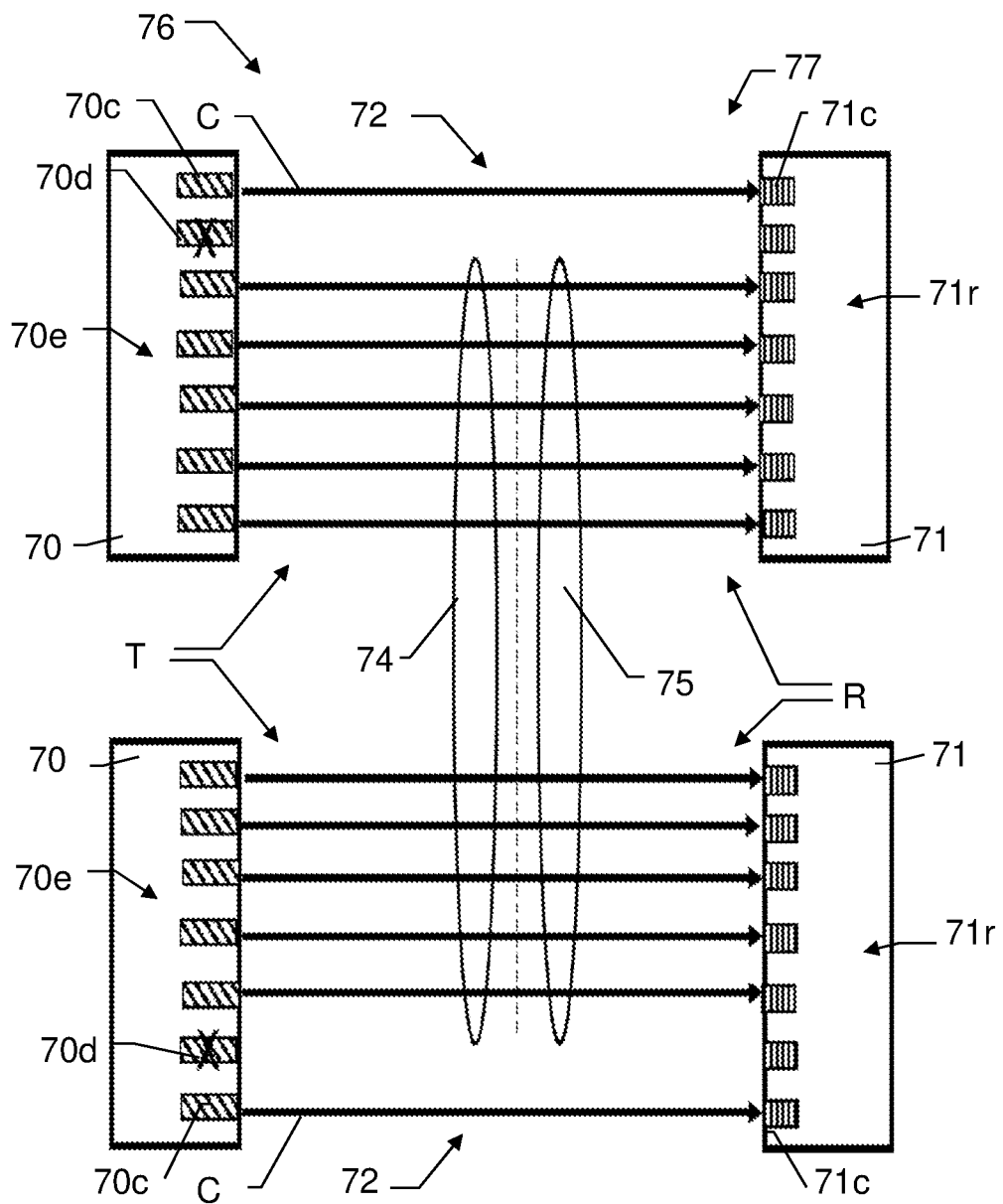
Figure 5:
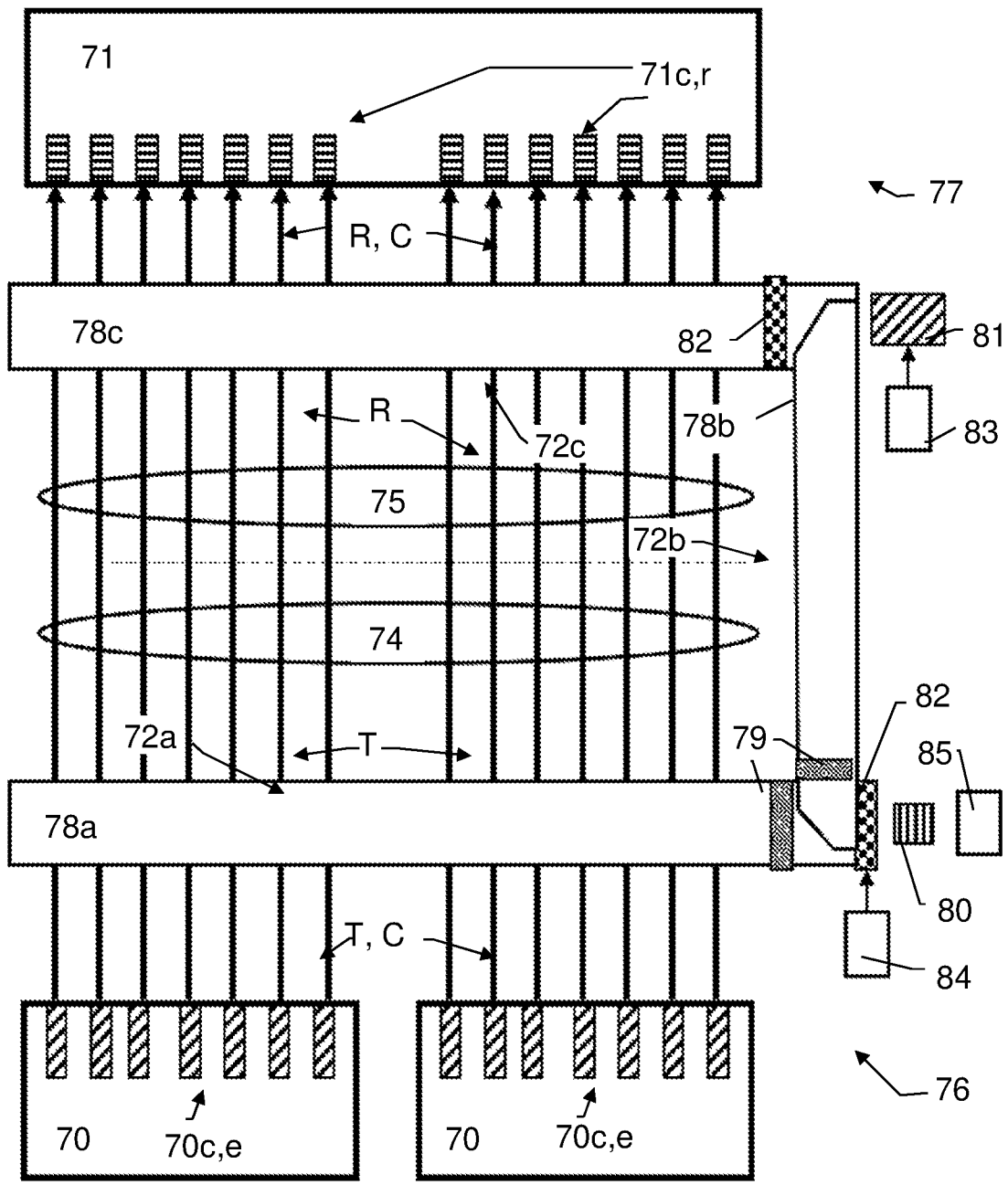
Figure 6:
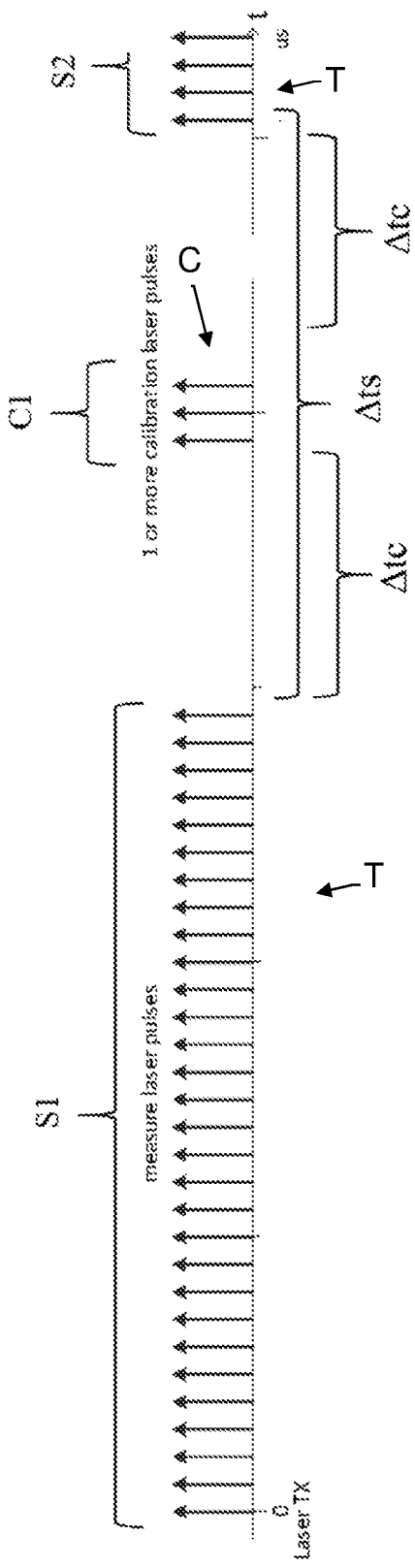
Figure 7:
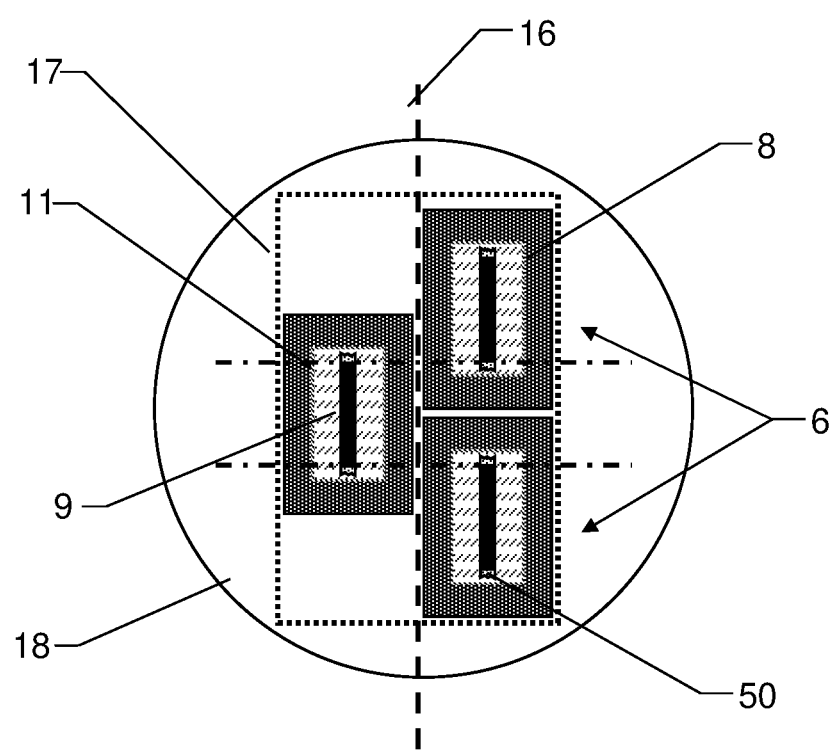
Figure 8:
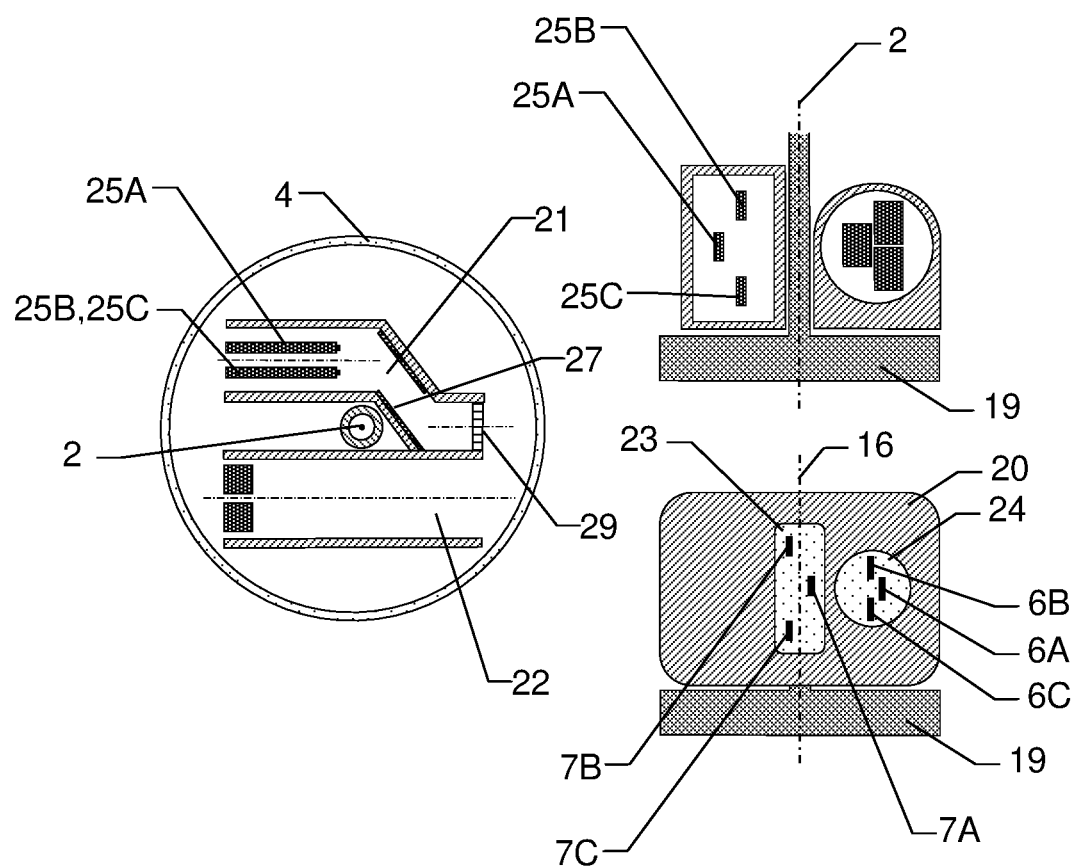
Figure 9:
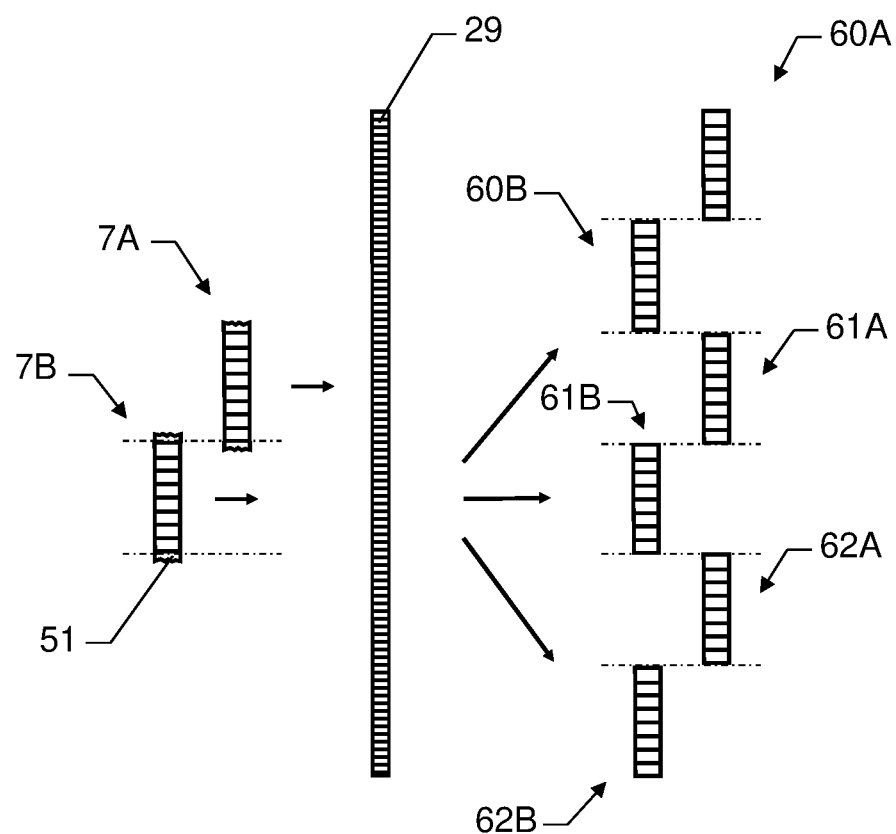
Figure 10:
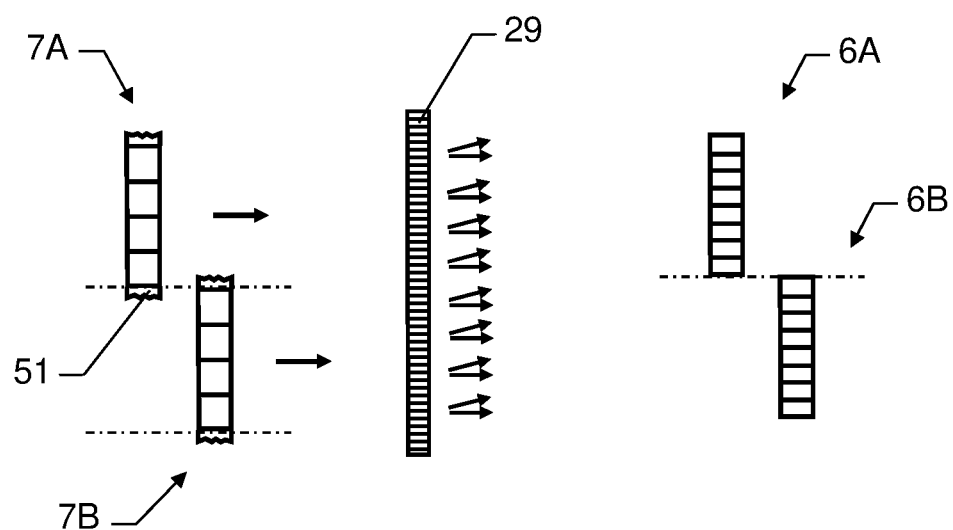
Figure 11:
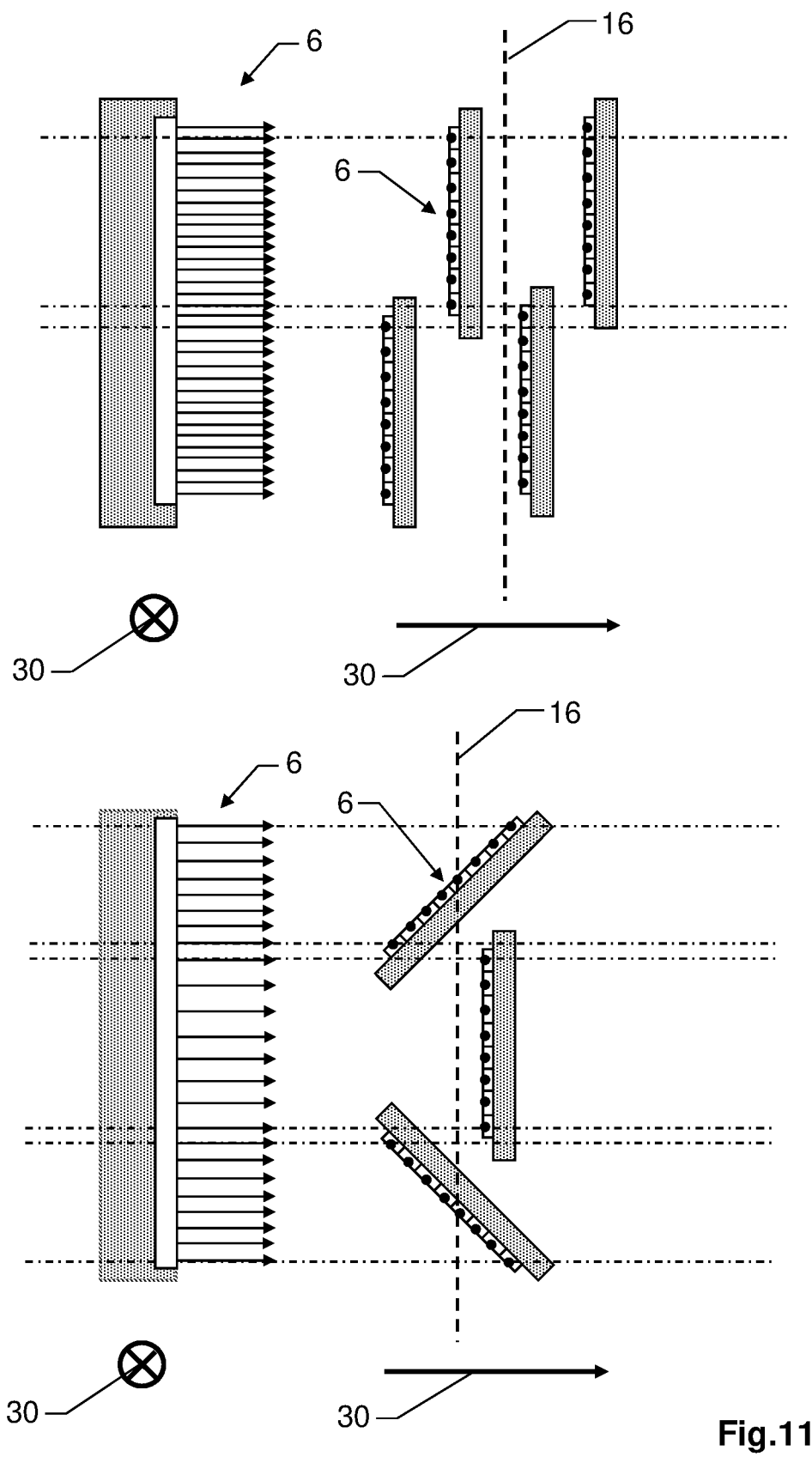
Figure 12:
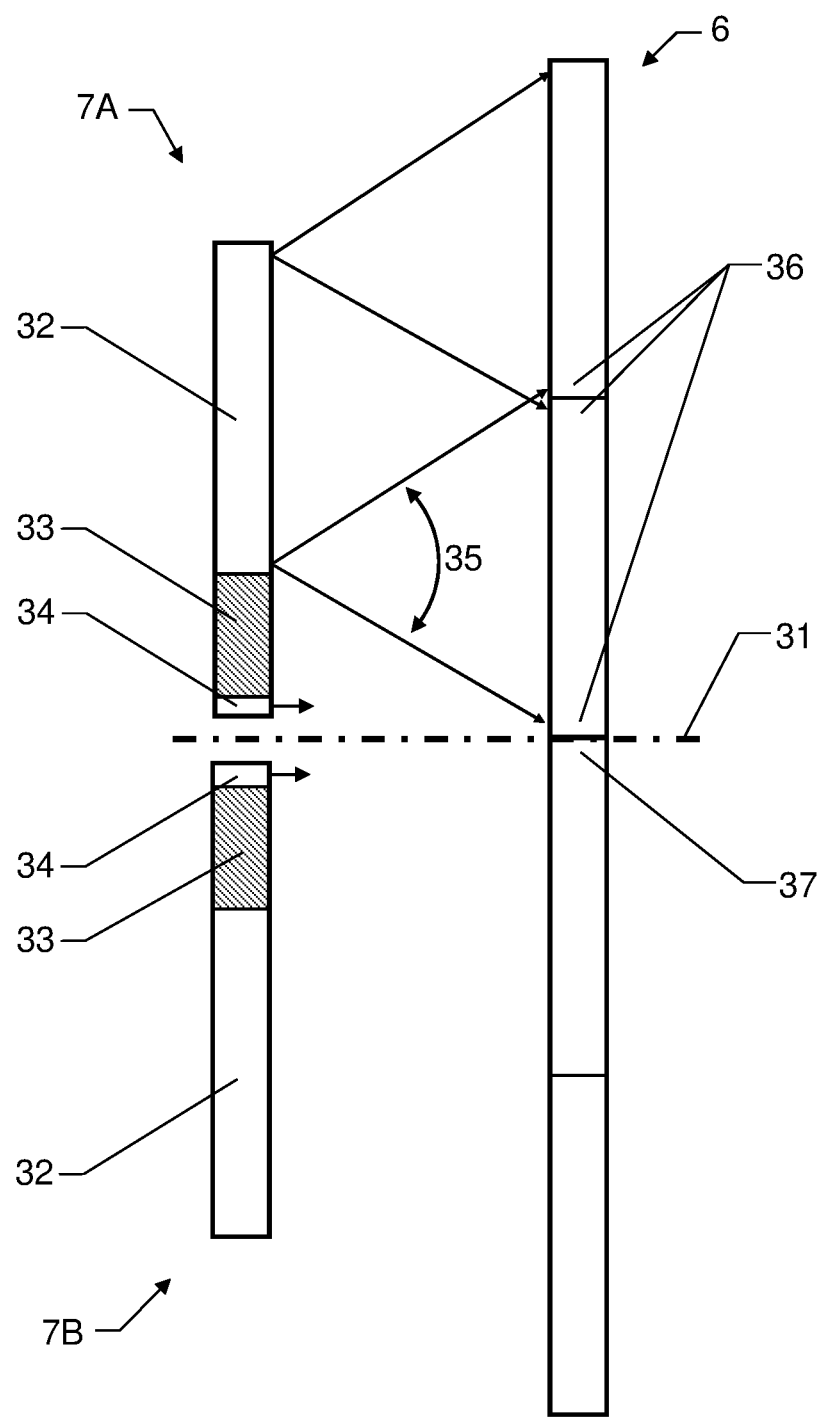
Figure 13:
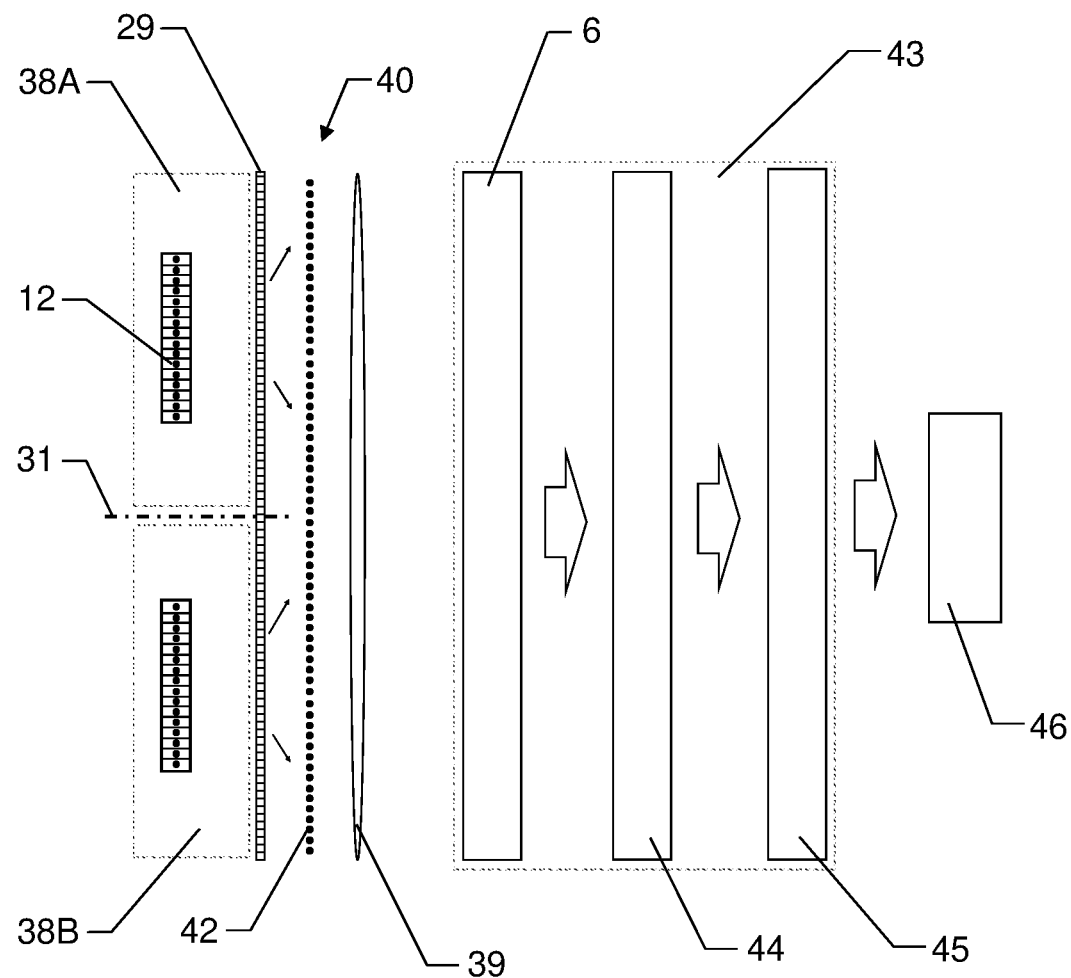

The measurement device and method according to the invention is described or explained in more detail below, purely by way of example, with reference to working examples shown schematically in the drawing. Identical elements are labelled with the same reference numerals in the figures. The described embodiments are generally not shown true to scale and they are also not to be interpreted as limiting the invention. Specifically, FIG. 1: an outer view of an exemplary measurement device;

FIG. 2: schematic representation of a detector array;

FIG. 3: schematic representation of paths of transmission beams;

FIG. 4: a first embodiment of a calibration device;

FIG. 5: a second embodiment of a calibration device;

FIG. 6: an example of a calibration method;

FIG. 7: schematically depicts a multiple array embodiment;

FIG. 8 schematically depicts another example of a measuring device;

FIG. 9 schematically shows a further embodiment using a beam splitting component;

FIG. 10 schematically shows another embodiment using a beam splitting component;

FIG. 11 schematically shows another embodiment with increased spatial resolution;

FIG. 12 schematically depicts an assignment between laser emitters and receiving surfaces;

FIG. 13 schematically depicts another embodiment of a measuring system; and

Figure 14:
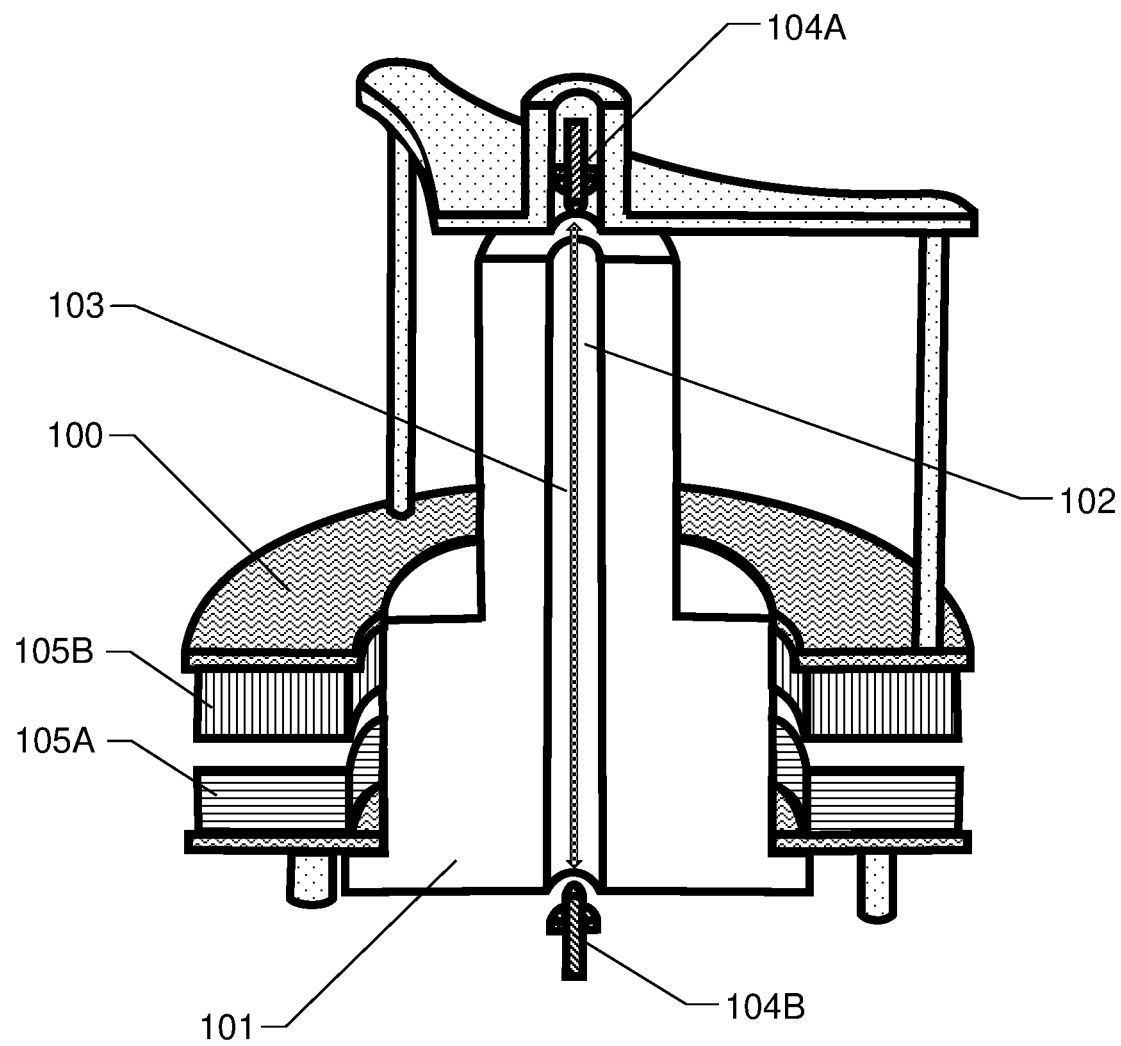

FIG. 14 schematically depicts an aspect relating to the transfer of data and energy.

DETAILED DESCRIPTION

FIG. 1 shows an outer view of an exemplary measurement device 1, formed with a base and a rotating member (not shown) arranged rotatably on the base about a rotation axis 2 relative to the base. By way of example, the rotating member is enclosed by a protective housing 3, which is fixed to the base and has a circumferential window 4 allowing the transmitted and the returning radiation to pass. Alternatively, the protective housing 3 could also be configured to rotate with the rotating member. In particular, the protective housing may be dustproof and/or waterproof (IP65), wherein the measurement device is configured to compensate for beam deflections of the transmitted and received beams caused by the circumferential window 4.

The measurement device 1 is configured to generate a plurality of transmission beams for transmitting pulsed distance measuring radiation, wherein different elevations can be scanned by different transmission beams. The elevation here refers to an angle to the axis of rotation 2, typically measured from a ground plane orthogonal to the axis of rotation 2. With exactly vertical alignment of the axis of rotation 2, as shown in the figure, the elevation thus corresponds to a certain distance of height above ground. However, it goes without saying that the measurement device 1 can be arranged in any orientation to the ground. For example, the elevation in a horizontal orientation of the axis of rotation 2 corresponds to an angle to the rotation axis measured from a vertical plane.

Referring to the exemplary horizontal arrangement of the measurement device shown in the figure, i.e. a vertical alignment of the rotation axis 2, the plurality of transmission beams thus defines a fan 5 of distance measuring beams rotating about the rotation axis 2 (lying in a vertical plane).

As a result, a circumferential field of view (field of the scanning area) may be generated, e.g. of 360°×25°, by rotating the fan 5 about the rotation axis 2. Alternatively, a partial field of view, e.g. 80°×25° may be scanned by oscillating the fan 5 back and forth or by only generating coordinate measuring data for a particular observation window, e.g. a particular azimuthal range. Furthermore, the measurement device can also be configured to provide an extension of the vertical field of view by tilting the rotating member with respect to the rotation axis 2.

The plurality of transmission beams is generated by means of a plurality of laser arrays (see below). Returning distance measuring beams of the different transmission beams entering a receiver objective unit are directed, e.g. in a straight or angled fashion, to a plurality of receiver arrays (see below), e.g. based on semiconductor photomultiplier sensors (SiPM sensors) or avalanche photo diodes (APD) configured for distance measurements.

Furthermore, the rotating member comprises a computing unit configured to derive a three-dimensional point cloud based on angle data providing the angular orientation of the rotating member about the rotation axis 2, the distance measurement data, and stored directional data providing the beam direction of each of the plurality of transmission beams. Alternatively, the computing unit can also be arranged statically, e.g. in the base.

FIG. 2 shows a schematic representation of a receiver array 6 comprising multiple receiving surfaces 9 made from a monolithic block, e.g. silicon block, and arranged along a respective receiver array axis.

The advantage of using such receiver arrays (and similarly transmitter arrays), in addition to the high mechanical precision, is the achievable small distance between the array elements providing for a corresponding high scan point density (small angular difference). However, such arrays cannot be arbitrarily stitched together, because at the ends of the arrays additional space is required for the packaging 8, e.g. comprising the housing with electronics, or additional space for sawing the electronics chip. Furthermore, at the axial ends of the closely stacked receiving surfaces 9, there are typically unusable areas 50 due to the process of generating the array from a monolithic block.

By way of example, the receiver array 6 is embodied as APD array comprising a plurality of closely stacked APDs 9 arranged in a housing with corresponding connectors 10. Typically, the housing further comprises a protection window 11, e.g. to protect the APDs 9 and the electronics from dust and/or humidity.

For example, a keyhole shaped aperture can be applied on the protection window or on the surface of the APD array.

On transmitter side (not shown), a laser bar of a certain number of laser diodes, e.g. eight laser diodes, may be used, wherein the laser diodes and corresponding connectors are typically arranged on an insulator substrate. For example, each laser diode has three stacked active emission zones. The width of the emission zones of pulse laser diodes is typically between 70 µm and 350 µm. In order to keep the beam divergence small, preferably a very narrow emission zone, e.g. 70 µm, is used. Optionally, for example, a cylindrical rod lens is placed close to the emission strip, also known as fast axis collimation (FAC) lens, e.g. to reduce the divergence of the laser beam in the fast axis-direction, to reduce the transverse emission angle and to symmetrize the beam profile.

FIG. 3 schematically depicts the paths 28A,28B of laser beams emitted from different laser diodes 12A,12B of a, for example semiconductor, laser array 7A, here comprising eight laser diodes. As an alternative to a laser array, an array of single lasers is used. The laser beams are transmitting through a beam splitting component 29, e.g. a diffraction grating, traveling to a target, and being detected by a corresponding receiver array 6A. In the example shown, each individual laser beam passing through the grating 29 is split into four beams emitted at well-defined angles based on the first four diffraction maxima. By way of example, the optical beam splitting component 29 is arranged in a common optical path section of the laser arrays 7A,7B.

The receiver array 6A comprises sixteen receiving surfaces (detection areas) 9, e.g. APDs. The measurement device is configured that in each of the multiple laser arrays 7A,7B the respective laser emitters are sequentially activated, and in each of the multiple laser arrays at least two immediately adjacent laser emitters 12A,12B are assigned to the same receiving surface, which, for example, has a double-keyhole shaped aperture for background light suppression. In other words, the beams generated by the two immediately adjacent laser emitters 12A,12B are detected by the same detection area, e.g. the same avalanche photodiode.

In other words, the optical beam splitting component 29 multiplies the incoming beams with "small" angles, wherein the "large" angles are effected by arranging the laser arrays 7A,7B having a (here a vertical) gap between each other. Thus, the gap is "filled" by the beam multiplication due to the beam splitting component 29. As a result of this filling in of the gaps between the laser arrays thanks to the beam splitting component 29 a seamless array arrangement is only required on the receiver side but not on the transmitter side.

As in principle known in the art, a distance to the target is measured absolutely based on the method of time of flight. Measuring the total travel time of a transmitted beam resp. a transmitted laser pulse, the absolute distance to the target is determined.

Now, there is provided an optical reference path to allow calibration of the absolute distance as described in the following figures.

FIG. 4 shows a first exemplary embodiment of an absolute measurement device with calibration capability. Depicted is the transmission unit 76 comprising multiple, for example two, laser arrays 70, arranged in an oblong direction. A respective laser array 70 is embodied as laser bar or semiconductor laser array. Alternatively, the emitter array is formed by an array of single or individual laser emitters integrated on the same electronic board/PCB or submount. The transmission unit 76 can be configured that each laser emitter of the laser array 70 has its own laser pulser or one or more laser pulsers are multiplexed sequentially to address the individual emitters of the laser array 70. A respective laser array 70 comprises a row of adjacent, preferably separately or individually controlled, laser emitters 70e. Transmission beams T are generated by emitters of the laser arrays 70 preferably in sequence (one emitter after the other) and transmitted to a measurement object (not shown) via a transmission optics 74 as beam exit area.

The beams R returning from the target object are transferred via a receiving optics 75 of the receiving unit 77 as beam entry area to receiver arrays 71, the receiver arrays 71 each comprising in the example a row of detectors 71r such as APDs, each APD capable of beam detection on its own The receivers 71r may share some components such as one ADC for a group or all receivers of an array. A respective APD 71r is capturing separately a received beam and using the principle of time of flight, the absolute distance to the target object or more exactly to a point measured with a respective laser beam is determined, based on a respective detection. The receiver arrays 71 can be embodied as a receiver bar or semiconductor receiver array each, or an array of discrete receivers mounted in a row on the same electronic board.

According to one aspect of the invention, the device comprises internal means for calibration of the absolute distance measurement. As shown, a laser beam, e.g. a laser beam C at the top or bottom array 70 along the vertical direction, can be used for an internal optical reference or calibration path 72 to allow calibration of the absolute distance. Choosing a marginal ray, a seamless manner of the spatial or angular spacing of the measurement beams T, R is not interrupted (cf. also the description relating to FIG. 7). The reference laser beam C for a respective laser array 70 is generated by a laser emitter 70c of a respective array 70, thus serving as reference emitter, wherein in the example the emitter 70c is situated at a respective edge.

By an optical guiding element, e.g. an arrangement of mirrors, lightguides or an optical fibre, the reference beams C are separated from the rest of the laser beams T, and transferred internally, e.g. as a free beam or by an optical guide such as a light fiber, to an APD 71c of the respective receiver array 71 where it is captured and detected. Again, the APD 71c used as reference receiver is the one situated at the edge of a respective array 71. Hence, there is an absolute distance reference beam path defined in between the reference emitter 70c of a respective array 70 and the reference receiver 71c or a respective related receiver array 71. Said otherwise, each pair of laser-APD array comprises its own reference emitter-receiver pair resp. own absolute distance reference path 72.

The (optical) distance resp. the length of the absolute distance reference beam path 72 between the reference emitter 70c and reference receiver 71c of associated laser and APD arrays is defined. For example, the distance between laser array 70 and linked receiver array 71 is stored in a memory of the receiving unit 77 and thus well known. Hence, by measuring the travel time of a respective calibration or reference beam C and considering the different light propagation times in the different media, the absolute distance measurement is calibrated.

Thus as shown, the exemplary embodiment provides a completely separate laser and a separate receiver channel for each of the laser arrays 70. As the emitters per array 70 behave pretty similar, using one of them (reference receiver 70c) the calibration is precise enough and valid for all of them.

Optionally, there is an attenuator within the calpath (not depicted), as the laser signal is least 10000 to 100000 times too strong to be directly received. Preferably, the attenuation means are adjustable in order to be adaptable to the current laser power. The adjustable attenuation is preferably also used to calibrate for the so called "range walk" which is the dependency of the measured distance on the intensity of the received optical signal. By variation of the intensity which impinges on the reference receiver with the adjustable attenuator the absolute distance can be calibrated for any optical signal intensity.

As another option, in order to prevent or minimize cross-talk between the reference laser emitter 70c resp. the reference receiver 71c and the other lasers 70e on the array 70 to other APDs on the array 71, a respective laser array 70 is build larger than actually needed for the target measurement. Having excess laser emitters, the outmost emitters of a for example twenty laser array is used as reference emitter 70c for the calibration and the next (or e.g. two or three) laser emitter 70d in the row is silenced or deactivated and not used. Thus, there is provided a gap of for example 1 mm for separation means of optical coupling. Spoken generally, the reference emitter 70c is offset from the other (active) emitters 70e of laser array 70, in particular more than a pitch of respective laser emitters, i.e. the distance to each other of the other measuring emitters.

As still another option, the reference emitters 70c and/or the reference receivers 71c are used both for calibration and for measuring, i.e. an emitter/receiver 70e/71r serves both as measurement emitter/receiver and as calibration emitter/receiver. For example, only part of the laser light of reference and now also measurement emitter 70c is coupled into the calibration path 72, e.g using a smaller coupling aperture than the laser beam extension or a semi-transparent mirror. Also, said deactivation of laser emitters in between mentioned above can be only temporarily during calibration. During measuring of absolute (target) distance which then is timely separate from the calibration, these laser emitters are activated again.

FIG. 5 illustrates another example of an embodiment with internal reference beam path resp. absolute distance calibration. As in the previous example, the absolute distance measuring device comprises an arrangement of laser arrays 70 for measuring an object (not shown) with a number of measurement beams T emitted to the target via transmitting optics 74 at different measurement angles, whereby reflected beams R are collected by a receiving optics 75 and captured by—in this example—a single long array 71 of receiving APDs 71r,. By way of example, transmitting optics 74 and receiving optics 75 can be identical or at least share parts or components, e.g. with overlapping or identical beam exit and entry area.

In the present example, contrary to the previous embodiment, all emitters 70e of the laser array 70 serve as (first) calibration or reference emitters 70c and all receivers 71r of receiver array 71 serve as (first) reference receivers 71c. Hence, all measurement emitters 70e and receivers 71r serve as reference emitters 70c and receivers 71c, too.

In addition, the device comprises a single second reference receiver in form of an additional separate APD 80 or a silicon photomultiplier (SiPM)-connected to an additional single amplifier, particularly realized as a transimpedance amplifier (TIA) 85- and a single second reference emitter in form of a single separate calibration laser 81, driven by a separate laser driver 83.

The defined calibration beam path is subdivided in three parts: a first one (72a) between the reference emitters 70c of the laser arrays 70 and the additional reference APD 80 or silicon photomultiplier (SiPM)-, wherefore a collecting (calibration) optics 78a is situated in the beam path, the collection optics coupling out part of the light of all laser beams T, C and transferring it as reference beams C to the reference APD 80. The individual calibration paths 72a for the different reference emitters 70c may be of different length depending on their position but this length is known beforehand and can be used during calibration.

A second part of reference beam path 72b is between the additional reference emitter, single laser 81, and the additional reference receiver APD 80, using a (calibration-to-calibration) optics 78b. A third part of calibration path 72c is defined between the single reference emitter 81 and all reference receivers 71c of APD array 71, using a spreading or diffusing optics 78c. Similarly to the first calibration path 72a the third calibration 72c path may be of different length for the individual reference receivers 71c.

Within the first and second reference beam path 72a,b, (fixed) attenuators 79 are inserted. In addition, there are variable attenuators 82, e.g. a liquid crystal attenuator or an optical filter wheel with different transmission, for adjustment of amplitude (84), before the single reference APD 80 or silicon photomultiplier (SiPM) and at the spreading optics 78c (the latter attenuator is alternatively a fixed one, too).

This adjustable attenuation in front of the reference receivers 71c can be used for "range walk" calibration. This refers to an amplitude dependent (i.e. dependent on the optical intensity of the received signal) distance error of the APDs or silicon photomultiplier (SiPM) and the succeeding electronics amplifiers (e.g. transimpedance amplifiers, TIAs). By varying the received optical intensity of the calibration signal of the single calibration laser 81, e.g. by means of the variable optical attenuator, e.g. a filter wheel 82 in front of the spreading optics 78c, the receiver signal intensity of the reference receivers 71 can be adjusted. As the absolute length of the calibration path is known, the calibration can be performed for varying input intensities.

As said above, the present embodiment shows a first defined absolute distance reference beam path 72a starting at a laser emitter 70c of the array and ending at supplemental receiver 80, a second defined absolute distance reference beam path 72b starting at supplemental emitter 81 and ending at supplemental receiver 80, and a third defined absolute distance reference beam path 72c starting at supplemental emitter 81 and ending at a receiver 71c of the receiver array 71. A respective leg 72a,b,c of the calibration path is measured, and the combined result gives the complete calibration parameters for the absolute distance measurement.

Hence, all emitters 70e of a laser array 70 can serve as reference emitters 70c and all receivers 71r of a receiver array 71 serve as reference receivers 71c. In the example, the device comprises an optical guiding element 78a for guiding part of the laser light C of all laser emitters 70c, e of the laser array 70 directly to the second reference receiver 80 and an optical guiding element 78c for guiding laser light of the second reference emitter 81 directly to all receivers 71c,r of the receiver array 71 and an optical guiding element 78b for guiding laser light of the second reference emitter 81 directly to the second reference receiver 80.

The idea is to collect the transmitted light in an area where all beams are (more or less) mixed. These signals are sent to the additional APD 80 or a silicon photomultiplier (SiPM)- and amplifier, particularly TIA 85 which may be placed where convenient, with some kind of attenuation means 79 in between and an added variable attenuator 82. With the latter it would be possible to even perform a range walk internally for the reference APD 80 or a silicon photomultiplier (SiPM) and reference amplifier, particularly TIA 85. The same receiving APD 80 sees the light of an additional calibration laser 81 which does not necessarily need to be of the same type as those of the arrays 70. It could for example be much weaker and therefore easier to drive. Still there has to be an attenuator 79 before the reference receiver 80 to make sure it is not saturated. The light of this calibration laser 81 is in addition diffused to the complete receiving area of the receiver array 71 so that each channel 71c receives it with appropriate amplitude.

The approach as described with reference to exemplary FIGS. 4 and 5 allow for absolute distance calibration without interfering the field of view of a static measuring device as a rotating one. In particular, the 360°-FoV of an instrument as described with respect to FIG. 1 is not interrupted or belittled at all. That is, an absolute distance measuring device with complete circumferential measuring window and in-situ absolute distance calibration is provided.

The embodiments according to FIGS. 4 and 5 can be extended or combined, too. For example, light of all laser array emitters 70c can be collected by an optics like element 78a of FIG. 5 and internally transmitted to a dedicated or single reference receiver 71c of the receiver array 71 in accordance with FIG. 4. Or the other way round, light of one reference emitter 70c of a laser array 70 (similar to FIG. 4) could be transferred to all receivers of the receiver array (this part similar to FIG. 5).

FIG. 6 illustrates schematically a calibration method according to one aspect of the invention. Shown is a timeline t (microseconds). Absolute distance to object points is measured using separate sequences S1, S2 ... of laser pulse. A first series or sequence 51 with a number of distinct measurement pulses T is generated and transmitted to the target, e.g. by sequential pulsing of the laser emitter elements of one or more laser arrays as depicted e.g. in the previous figures, wherein the pulse or laser shot rate can be adapted to an ambiguity range, i.e. a separation between pulses necessary to unambiguously distinguish between different measurements.

After a time gap Δts in the range of e.g. a few or some ten to hundred microseconds, the second measurement pulse sequence S2 is fired, after another gap Δts the third one and so on. The final number of distance measurements per second is lower than the laser shot rate which is determined by the distance ambiguity that has to be resolved. Therefore, it is possible to shoot the laser emitters consecutively at the full rate until each has emitted one pulse and add a gap until shooting again.

These gaps Δts are now used for performing the calibration of one, several or all of the laser/receiver calibration or reference paths, depending on the final measurement rate. Separated from the previous and next measurement sequence S1 and S2 by time windows Δtc, one or more calibration laser pulses C, e.g. a calibration pulse sequence C1 of three pulses as shown, are generated and transmitted along the reference beam path.

Thus, at least one calibration measuring of an absolute distance of an absolute distance reference beam path of defined length is executed using at least one calibration laser pulse C separate from the sequences S1, S2 of distinct laser pulses during said time gap Δts in between subsequent sequences S1, S2.

In embodiments such as shown in FIG. 5, having more than one absolute distance reference path resp. a subdivided calibration path, a complete calibration cycle can be done step by step, each step within one time gap Δts. With reference to FIG. 5, for instance, the first reference beam path 72a is measured in a first measuring pause Δts, the second reference beam path 72b in the next gap Δts, and the third reference beam path 72c in the third one.

Said otherwise, the calibration in operation takes place in three phases during the transmission gaps Δts. First the delay (or drift) of the transmitters 70c to the calibration APD 80 is measured, then the delay from the separate calibration laser 81 to all APD arrays 71c is measured and finally the delay between calibration laser 81 and calibration APD 80 is determined. The gaps Δts happen so often that a complete calibration cycle for all channels could be done several times during a measurement session or e.g. per revolution in case of a rotating measurement device like laser profiler or the like, covering the typical drift time constants. Using such a solution with time separation of measurement and calibration, the risk of crosstalk is even more lowered (in addition to the benefit of attenuators) and because the coupling is less critical.

In other words, the multiple measurement gaps are used to cover e.g. the first complete reference beam path between a first reference laser and a first reference receiver of respective arrays within one transmission gap, the second complete reference path between the next reference laser and receiver pair in the following time gap and so on. Alternatively, all such phases are performed in one and the same transmission gap Δts, but e.g. for only one pair of reference elements (complete path between one first reference laser emitter and one first reference laser receiver). That is, after a number of measurement sequences, all measurement beams have been successively calibrated.

FIG. 7 shows a frontal view onto an exemplary arrangement of three receiver arrays 6 wherein at least in one direction the arrays 6 are stacked without additional spacing, allowing for homogeneous scanning of the object to be measured. Here, the receiver arrays 6 are embodied as shown by FIG. 2.

The receiver arrays 6 are arranged along a longitudinal axis 16 of an oblong receiver section 17, wherein one of the receiver arrays is horizontally displaced with respect to the other two. Therefore, measured along the longitudinal axis 16 of the oblong receiver section 17, e.g. wherein the longitudinal axis is parallel to the vertical axis, the receiving surfaces 9 are arranged in a seamless fashion. In other words, measured along the longitudinal axis 16 the height difference (e.g. in the vertical direction) between two successive receiving surfaces within the oblong receiving section 17 corresponds to the pitch or spacing between adjacent receiving surfaces 9 within the receiver arrays 6.

For example, the receiver arrays 6 are aligned with the help of micromanipulators on the plane on which the arrays are located and then glued or soldered to a common electronics board 18. The electronic board 18 is then installed and aligned in the rotating member (see below).

FIG. 8 schematically depicts the measurement device in a top view on the left, from behind on the top right, and up front in the bottom right.

The axis of rotation 2 is defined by a hollow shaft (see FIG. 12), extending from the base 19 along the axis of rotation into the rotating member 20. The rotating member 20 comprises a transmission optical path 21 and a reception optical path 22. The rotating member is configured to rotate a beam exit area 23 of the transmission unit and a beam entry area 24 of the receiver unit about the axis of rotation 2.

In the example shown, the transmission unit comprises three semiconductor laser arrays 7A, 7B, 7C arranged on separate electronic boards 25A, 25B, 25C. The separate electronic boards 25A, 25B, 25C are arranged parallel with respect to each other such that the laser arrays 7A, 7B, 7C are arranged along a longitudinal axis 16 of an oblong emitter section, the longitudinal axis 16 corresponding to the splitting direction of an optical splitting component 29, e.g. a diffractive optical element.

Here, the laser arrays 7A, 7B, 7C share an objective unit, wherein, for example, the transmission optical path 21 is configured that the transmission beams are guided by mirrors 27 in such a way that the beam exit area 23 is arranged radially symmetric with respect to the axis of rotation 2.

The receiving optical path 22 comprises three separately packed receiver arrays 6A, 6B, 6C arranged as described by FIG. 4, wherein each receiver array is assigned to one of the three laser arrays 7A, 7B, 7C. Further, in the example shown the receiving optical path 22 comprises a common objective for all receiver arrays 6A, 6B, 6C.

Apparently the pitch between the laser diodes of one laser array and the focal length of the transmission optical path 21 and the pitch between the receiving surfaces of the receiver arrays and the focal length of the receiving optical path as well as the angular spacing of the different beams of the DOE 29 have a well-defined relationship so that the angles of the transmission beams matches the angles of the receiver optics.

Similarly, the number of laser diodes per laser array as well as the number of receiver surfaces per receiver array as well as the total number of laser arrays and receiver arrays as well as the number of the different beams of the DOE have a well-defined relationship so that the numbers of transmission beams matches the number of receiving surfaces.

FIG. 9 schematically depicts a further embodiment using a beam splitting component 29, wherein here, the beam splitting component multiplies the incoming beams with "large" angles (compared to the splitting component of FIG. 6). Here, the laser arrays 7A,7B are arranged in a seamless manner, i.e. similarly as described above in FIG. 4 for the receiver side, wherein the complete bundle of beams of a respective laser array 7A,7B is multiplied. By way of example, the beam splitting component 29 is a diffractive optical element and multiplies the beam bundles into three beam bundles based on the first three diffraction maxima, wherein the three beam bundles which are detected by three separate receiver arrays 60A, 61A, 62A, 60B, 61B, 62B respectively associated to the different laser arrays 7A,7B.

Similar to the receiver array, at the axial ends with respect to the laser array axis the laser arrays 7A,7B have unusable areas 51 due to the process of generating the arrays from a monolithic block.

FIG. 10 schematically depicts a further embodiment using a beam splitting component 29, wherein here, the beam splitting component 29 effects a beam splitting at very small angles for generating an additional smaller angle than that predetermined by the pitch of the laser array 7A,7B. For example, this can be used to increase the resolution.

FIG. 11 schematically depicts a further embodiment where interleaving or tilting of the laser arrays or the receiver arrays, respectively, is used to increase the spatial resolution.

In the upper part an interleaved arrangement of four receiver arrays 6 is shown, namely the upper left showing a side view and the upper right showing a front view. For example, due to the interleaved arrangement of the receiver arrays 6 the resolution in the vertical direction (i.e. in the orthogonal to the direction of rotation) is doubled.

In the embodiment shown in the lower part, again showing a side view on the left and a front view on the right, two of the receiver arrays 6 are tilted towards the direction of rotation 30 of the measurement device. This also leads to an increased vertical resolution.

In particular, the (e.g. vertical) spatial resolution may be increased by at least one of the following measures: at least part of the laser arrays being tilted towards the direction of rotation of the rotating member about the axis of rotation; the laser arrays being arranged with respect to each other that, measured along the longitudinal axis of the oblong emitter section, the laser emitters of two different laser arrays are arranged in an interleaving fashion; the receiver arrays being arranged with respect to each other that, measured along the longitudinal axis of the oblong receiver section, the receiving surfaces of two different receiver arrays are arranged in an interleaving fashion; and at least part of the receiver arrays being tilted towards the direction of rotation of the rotating member about the axis of rotation.

FIG. 12 schematically depicts an assignment between laser emitters and receiving surfaces, wherein in this embodiment two semiconductor lasers arrays 7A, 7B are arranged with a gap between each other with respect to a direction corresponding to the splitting direction, e.g. a direction parallel to the axis of rotation. For example, the laser arrays 7A,7B are arranged symmetrically to the optical axis 31 of a common objective lens for both laser arrays.

Each of the two semiconductor laser arrays 7A, 7B is divided into three different areas, i.e. a so-called measurement emitter area 32, a so-called dead area 33, and a calibration emitter area 34.

The measurement emitter area 32 comprises multiple laser emitters for generating the beams of the initial beam pattern as described above. The calibration emitter area 34, e.g. arranged towards the gap (here towards the optical axis 31 of the common objective lens), comprises at least a further laser emitter used for generating reference radiation to be directed to an internal optical reference path in order to calibrate the measurement device for an absolute distance measurement. In between the measurement emitter area 32 and the calibration emitter area is the dead area 33, providing that the laser beam(s) of the calibration emitter area 34 is/are at least offset from the laser emitters of the measurement emitter area 32 by a distance of more than the pitch of the measurement emitter area 32. For example, the dead area comprises multiple unused (non-emitting and thus dark) laser emitters.

In order to provide a seamless scan pattern an optical beam splitting component as described above is used, configured that the beams generated by the laser emitters of the measurement emitter areas 32 of the two laser arrays 7A,7B generate a seamless outgoing beam pattern, which can be imaged by a receiver array 6, e.g. comprising multiple APDs. For example, the beams of the outgoing beam pattern are assigned in a one-to-one relationship to individual receiving surfaces of the receiver array 6.

By way of example, the optical beam splitting component is configured to split incoming beams into two outgoing beams having a well-defined angular separation 35 such that the overall gap between the measurement emitter areas 32—generated by the gap between the laser arrays 7A,7B, the dead areas 33, and the calibration emitter areas 34—is "filled" by the multiplication of the beams of individual laser emitters by the optical beam splitting component. In the outgoing beam pattern axial ends 36 of transmission beams originating from the first semiconductor laser array adjoin and the transmission beams in the outgoing beam pattern that originate from the first semiconductor laser array 7A adjoin an axial end 37 of the transmission beams that originate from the other semiconductor laser array 7B.

FIG. 13 schematically depicts an embodiment of the transmission unit on the left and a corresponding receiver unit on the right.

The transmission unit comprises two laser boards 38A, 38B, each comprising sixteen laser emitters 12 made from a monolithic semiconductor, e.g. silicon, block, wherein the two laser boards 38A, 38B are arranged symmetrically to the optical axis 31 of an objective lens unit 39, e.g. a common lens for both laser boards. The optical beam splitting component 29 is configured to split incoming beams into two outgoing beams. Based on that, an outgoing beam pattern 40 is generated, which, with respect to the vertical direction, allows scanning by 64 seamlessly arranged spots 42 on a target in the environment (the spots/transmission beams having essentially the same angular separations).

On the receiver side, a receiver array 6 comprising a plurality of receiving surfaces, e.g. avalanche photodiodes, is arranged on a receiver board 43. The receiving surfaces are each configured to separately detect returning beams of the outgoing beam pattern 40. The receiver board 43 further comprises an arrangement of multiple transimpedance amplifiers 44, wherein each of the transimpedance amplifiers is connected to a defined number of, e.g. adjacent, receiving surfaces of the receiver array 6. The output of the amplifiers is fed to a multiplexer circuit 45 configured to selectively provide the amplifier outputs to an analog-to-digital circuit 46 configured to determine return times of transmitted measurement pulses by the laser emitters 12.

FIG. 14 shows an aspect relating to the transfer of data and energy between the rotating member 100 and the static base 101. The figure shows a vertical cut through the rotation mechanics of the measurement device (without optical elements).

The base 100 comprises a hollow shaft 102 defining the axis of rotation, the hollow shaft 102 extending along the axis of rotation into the rotating member 100, wherein the rotating member 100 is rotatable relative to the base 101 about the axis of rotation, i.e. about the hollow shaft 102. The embodiment further comprises an optical data transmission unit configured to provide wireless data exchange between the base 101 and the rotating member 100 by means of an optical signal 103.

The optical data transmission unit comprises a data transmitter 104A, which may particularly be embodied as data transceiver, being mounted to the rotating member 100 such that it is located at one distal end of the shaft. Furthermore, a data receiver 104B, which may particularly be embodied as data transceiver, is mounted to the base 101 at the other distal end of the shaft 102. The data transmitter 104A and receiver 104B are configured and arranged to exchange data by an optical signal 103 propagating in a free-beam manner in the inside of the hollow shaft 102. In particular, the data transmitter 104A and receiver 104B may be embodied as data transceivers which allow to simultaneously send and receive data via the optical signal 103.

The measurement device further comprises an inductive power exchange unit, configured to provide power exchange between the base 101 and the rotating member 100 and comprising a power transmitter 105A and a power receiver 105B.

As shown by the figure, the power receiver 105B and the power transmitter 105A of the inductive power exchange unit are arranged about the hollow shaft 102 in an area axially displaced from the data transmitter 104A and receiver 104B, which reduces mutual interferences between the transmission unit and the power exchange unit.

Although the invention is illustrated above, partly with reference to some preferred embodiments, it must be understood that numerous modifications and combinations of different features of the embodiments can be made. All of these modifications lie within the scope of the appended claims.

Hence, according to one aspect, the invention relates to an absolute distance measuring device comprising a transmission unit having at least one laser array, the laser array comprising multiple measurement laser emitters arranged along a laser array axis and configured to generate a beam pattern and a beam exit area, the transmission unit being configured to emit a plurality of transmission beams via the beam exit area at different measurement angles, and a receiver unit having a measurement beam entry area and at least one receiver array comprising multiple measurement receivers arranged along a receiver array axis, the receiver unit being designed for beam detection by a respective measurement receiver of at least one transmission beam of the plurality of transmission beams returning via the beam entry area and for measuring of an absolute distance based on a respective detected transmission beam and the principle of time-of-flight, wherein the laser array comprises at least a first reference laser emitter and the receiver array comprises at least a first reference receiver, the reference laser emitter and reference receiver defining an internal absolute distance reference beam path of defined length for calibration of the device with respect to said measuring of absolute distance.

Optionally, one of the measurement laser emitters serves as first reference laser emitter and/or one of the measurement receivers serves as first reference receiver.

Optionally, the device comprises an optical guiding or deflection element for guiding a reference beam from the first reference laser emitter of the laser array to the first reference receiver of the receiver array such that the absolute distance reference beam path is defined in between the first reference laser emitter of the emitter array and the first reference receiver of the receiver array.

Optionally, the first reference laser emitter is offset from the measurement laser emitters along the laser array axis by a distance more than a pitch of respective laser emitters, in particular by permanent or temporary deactivation of a number of laser emitters next to the reference laser emitter along the laser array axis and/or the first reference receiver is offset from the measurement receivers along the receiver array axis by a distance more than a pitch of respective receivers, in particular by permanent or temporary deactivation of a number of receivers next to the reference receiver along the receiver array axis.

Optionally, the device comprises a second reference laser emitter in addition to and separate from the laser array and/or a second reference receiver in addition to and separate from the receiver array.

Optionally, the internal absolute distance reference beam path is subdivided into a first distance reference beam path defined between the first reference laser emitter and the second reference receiver, a second absolute distance reference beam path defined between the second reference laser emitter and the second reference receiver and a third absolute distance reference beam path defined between the second reference laser emitter and the first reference receiver.

Optionally, the device comprises at least one optical guiding or deflection element for guiding part of the laser light of at least one, in particular all, laser emitter of the laser array to the second reference receiver and/or at least one optical guiding or deflection element for guiding laser light of the second reference laser emitter directly to at least one, in particular all, receiver of the receiver array and/or at least one optical guiding or deflection element for guiding laser light of the second reference laser emitter directly to the second reference receiver.

Optionally, the optical guiding or deflection element for guiding laser light of all laser emitters directly to the second reference receiver is situated in an area where the beams of all laser emitters are mixed.

Optionally, device comprises a variable optical attenuator situated in the reference beam path.

Optionally, the transmission unit is configured to generate the beam pattern by sequential activation of the laser emitters.

Optionally, the device comprises a base, a rotating member comprising the transmission unit and the receiver unit, the rotating member being rotatable relative to the base about an axis of rotation and configured to rotate the beam exit area of the transmission unit and the beam entry area of the receiver unit about the axis of rotation, an angle determining unit configured to determine angular data relating to the angular orientation of the rotating member about the axis of rotation, and a computing unit configured to derive three-dimensional point cloud data by combining the angle data, the distance measurement data, and stored directional data providing the beam direction of each of the plurality of transmission beams relative to the rotating member.

According to another aspect, the invention relates to a calibration method for absolute distance measuring according to the principle of time-of-flight of an absolute distance measuring device, in particular according to the invention, with emitting a plurality of transmission beams at different measurement angles according to a beam pattern, wherein the transmission beams are emitted as sequences of distinct laser pulses with a time gap in between subsequent sequences, receiving returning transmission beams of the plurality of transmission beams with detection of beams, measuring of an absolute distance based on the detection and the principle of time-of-flight, calibrating of the absolute measuring of distance based on at least one calibration measuring of an absolute distance of an absolute distance reference beam path of defined length using at least one laser pulse separate from the sequences of distinct laser pulses during said time gap in between subsequent sequences.

Optionally, the method comprises multiple calibration measurements with different laser pulse intensity for range walk compensation.

Optionally, the internal absolute distance reference beam path is subdivided into a first, second and third absolute distance reference beam path and the calibrating is based on a first calibration measuring of an absolute distance of the first absolute distance reference beam path during a first time gap in between subsequent sequences, a second calibration measuring of an absolute distance of the second absolute distance reference beam path of defined length during a second time gap in between subsequent sequences, and a third calibration measuring of an absolute distance of the second absolute distance reference beam path of defined length during a third time gap in between subsequent sequences.

According to another aspect, the invention relates to a computer program product comprising program code, which is stored on a machine-readable medium, or being embodied by an electromagnetic wave comprising a program code segment, and having computer-executable instructions for performing, in particular when run on a device according to the invention, the calibration method according to the invention.

According to another aspect, the invention relates to a measurement device for the three-dimensional geometric capture of an environment, comprising a base, a rotating member comprising a transmission unit and a receiver unit, the rotating member being rotatable relative to the base about an axis of rotation and configured to rotate a beam exit area of the transmission unit and a beam entry area of the receiver unit about the axis of rotation, an angle determining unit configured to determine angular data relating to the angular orientation of the rotating member about the axis of rotation, the transmission unit configured to emit a plurality of transmission beams via the beam exit area, wherein transmission beams of the plurality of transmission beams are respectively emitted at different elevation angles with respect to the axis of rotation, the receiver unit configured to detect transmission beams returning via the beam entry area and to generate distance measurement data relating to the plurality of transmission beams, and a computing unit configured to derive three-dimensional point cloud data by combining the angle data, the distance measurement data, and stored directional data providing the beam direction of each of the plurality of transmission beams relative to the rotating member, wherein the transmission unit comprises multiple semiconductor lasers arrays, each semiconductor laser array comprising multiple laser emitters made from a monolithic block and arranged along a respective laser array axis, particularly wherein the pitch between adjoining laser emitters is at most 500 µm, wherein on both axial ends of the semiconductor laser array, with respect to the respective laser array axis, the extension of the emitter-free area is longer than half the pitch between adjoining laser emitters, the multiple semiconductor lasers arrays are arranged and configured to generate an initial beam pattern, wherein the transmission unit further comprises an optical beam splitting component arranged and configured that, the initial beam pattern is split into an outgoing beam pattern, wherein the outgoing beam pattern is a multiple of the initial beam pattern generated by splitting individual beams of the initial beam pattern into multiple beams being arranged with well-defined angular separations with respect to a splitting direction, the pitch between adjacent laser emitters provides a given minimal angular distance, with respect to the splitting direction, between beams in the outgoing beam pattern that originate from the same semiconductor laser array, and the actual angular distance between adjacent beams of the outgoing beam pattern is in each case less than or equal to the given minimal angular distance provided by the pitch.

Optionally, the multiple semiconductor lasers arrays are arranged with a gap between each other with respect to a direction corresponding to the splitting direction, particularly a direction parallel to the axis of rotation.

Optionally, the multiple semiconductor laser arrays are shifted from another and/or rotated with respect to each other such that, with respect to the direction corresponding to the splitting direction, the center-to-center gap between adjoining laser emitters of different semiconductor laser arrays are less than or equal to the pitch between laser emitters corresponding to the same semiconductor laser array.

Optionally, the optical beam splitting component is based on at least one of a diffractive optical element, a refractive optical element, a diffraction grating, particularly a Dammann grating, and a holographic optical element.

Optionally, each of the multiple semiconductor laser arrays comprises eight laser diodes, wherein the optical beam splitting component is arranged in a common optical path section of the multiple semiconductor laser arrays and configured to split a respective incoming beam into at least two, particularly at least four, outgoing beams, and the receiver unit comprises a receiver array having eight, particularly sixteen, receiving surfaces arranged along a respective receiver array axis for separately capturing individual transmission beams.

Optionally, each semiconductor laser array is configured that its laser emitters are individually controlled, particularly wherein the transmission unit is configured that each emitter is controlled by its own laser pulser or each emitter is sequentially connected to a common laser driver.

Optionally, the measurement device is configured that the receiver unit comprises a receiver array having multiple receiving surfaces arranged along a respective receiver array axis for separately capturing individual transmission beams, in each of the multiple semiconductor laser arrays the respective laser emitters are sequentially activated, and in each of the multiple semiconductor laser arrays at least two immediately adjacent laser emitters are assigned to the same receiving surface, namely the measurement device is configured that the beams generated by the at least two immediately adjacent laser emitters are detected by the same receiving surface.

Optionally, the transmission unit comprises an objective lens, which is shared by the multiple semiconductor laser arrays, wherein the transmission unit is configured to provide an elevation field of view of at least 10°, or each semiconductor laser array comprises its own objective lens, wherein the transmission unit is configured to provide an elevation field of view of at least 40°.

Optionally, the measurement device comprises a zoom component configured to compensate a focal length mismatch between the receiver unit and the transmission unit, particularly to adjust focal length tolerances of the receiver unit relative to focal length tolerances of the transmission unit relating to the optical beam splitting component.

Optionally, the semiconductor laser arrays are arranged along respective arcs defined by the image field curvature caused by the transmitting optics, particularly wherein the semiconductor laser arrays are assigned to different tangents of the corresponding arc respective laser array axes are arranged parallel to their assigned tangents.

Optionally, the measurement device comprises an internal optical reference path for calibration of an absolute distance measurement by the computing unit, a laser emitter at one of the axial ends, with respect to the corresponding laser array axis, of one of the multiple semiconductor laser arrays is configured to provide a reference laser beam to the internal optical reference path.

Optionally, the multiple semiconductor lasers arrays are arranged that the laser emitters are arranged in an elongated distribution, particularly in a direction corresponding to the splitting direction or along the longitudinal direction of the oblong arrangement section, and a laser emitter at one of the axial ends with respect to a longitudinal axis of the elongated distribution is configured to provide the reference laser beam to the internal optical reference path.

Optionally, the multiple semiconductor lasers arrays are arranged that the laser emitters are distributed along an arrangement direction corresponding to the splitting direction, and the laser emitter providing the reference laser beam to the internal optical reference path is arranged at the axial end towards the gap, particularly wherein the laser emitter providing the reference laser beam is offset from the rest of the laser emitters of the same semiconductor laser array by a distance of more than the pitch of the rest of the laser emitters, particularly at least three times the pitch.

Optionally, the receiver unit comprises a receiver array, a plurality of amplifiers, particularly transimpedance amplifiers, a selector, particularly comprising a multiplexer circuit, and a signal analyzer, particularly comprising an analog-to-digital circuit, more particularly a multi-channel analog-to-digital circuit or a time-to-digital converter, wherein the receiver array has a plurality of receiving surfaces arranged along a respective receiver array axis for separately capturing individual transmission beams of the outgoing beam pattern, particularly wherein each of the transmission beams of the outgoing beam pattern is uniquely assigned to one of the receiving surfaces, more particularly by a ono-to-one assignment of individual transmission beams to individual receiving surfaces, each amplifier of the plurality of amplifiers is connected to several, particularly adjacent, receiving surfaces of the plurality receiving surfaces, and the plurality of amplifiers is connected to the analyzer via the selector.

According to another aspect, the invention relates to a measurement device for the three-dimensional geometric capture of an environment, comprising a base, a rotating member comprising a transmission unit and a receiver unit, the rotating member being rotatable relative to the base about an axis of rotation and configured to rotate a beam exit area of the transmission unit and a beam entry area of the receiver unit about the axis of rotation, an angle determining unit configured to determine angular data relating to the angular orientation of the rotating member about the axis of rotation, the transmission unit configured to emit a plurality of transmission beams via the beam exit area, wherein transmission beams of the plurality of transmission beams are respectively emitted at different elevation angles with respect to the axis of rotation, the receiver unit configured to detect transmission beams returning via the beam entry area and to generate distance measurement data relating to the plurality of transmission beams, and a computing unit configured to derive three-dimensional point cloud data by combining the angle data, the distance measurement data, and stored directional data providing the beam direction of each of the plurality of transmission beams relative to the rotating member, wherein the transmission unit comprises multiple semiconductor lasers arrays, each semiconductor laser array comprising multiple laser emitters made from a monolithic block and arranged along a respective laser array axis, particularly wherein the pitch between adjoining laser emitters is at most 500 μm, wherein on both axial ends of the semiconductor laser array, with respect to the respective laser array axis, the extension of the emitter-free laser array area is longer than half the pitch between adjoining laser emitters, the multiple semiconductor laser arrays are shifted from another and/or rotated with respect to each other such that the multiple laser emitters of the multiple semiconductor laser arrays are arranged in an oblong arrangement section, wherein, with respect to a longitudinal direction of the oblong arrangement section, the center-to-center gap between adjoining laser emitters of different semiconductor laser arrays is less than or equal to the pitch between laser emitters corresponding to the same semiconductor laser array, and an outgoing beam pattern is generated, wherein the angular distance between adjacent beams of the outgoing beam pattern is in each case less than or equal to a given minimal angular distance, with respect to a direction corresponding to the longitudinal direction of the oblong arrangement section, provided by the pitch between beams in the outgoing beam pattern that originate from the same semiconductor laser array.

Optionally, each semiconductor laser array is configured that its laser emitters are individually controlled, particularly wherein the transmission unit is configured that each emitter is controlled by its own laser pulser or each emitter is sequentially connected to a common laser driver.

Optionally, the measurement device is configured that the receiver unit comprises a receiver array having multiple receiving surfaces arranged along a respective receiver array axis for separately capturing individual transmission beams, in each of the multiple semiconductor laser arrays the respective laser emitters are sequentially activated, and in each of the multiple semiconductor laser arrays at least two immediately adjacent laser emitters are assigned to the same receiving surface, namely the measurement device is configured that the beams generated by the at least two immediately adjacent laser emitters are detected by the same receiving surface.

Optionally, the transmission unit comprises an objective lens, which is shared by the multiple semiconductor laser arrays, wherein the transmission unit is configured to provide an elevation field of view of at least 10°, or each semiconductor laser array comprises its own objective lens, wherein the transmission unit is configured to provide an elevation field of view of at least 40°.

Optionally, the measurement device comprises a zoom component configured to compensate a focal length mismatch between the receiver unit and the transmission unit, particularly to adjust focal length tolerances of the receiver unit relative to focal length tolerances of the transmission unit relating to the optical beam splitting component.

Optionally, the semiconductor laser arrays are arranged along respective arcs defined by the image field curvature caused by the transmitting optics, particularly wherein the semiconductor laser arrays are assigned to different tangents of the corresponding arc respective laser array axes are arranged parallel to their assigned tangents.

Optionally, the measurement device comprises an internal optical reference path for calibration of an absolute distance measurement by the computing unit, a laser emitter at one of the axial ends, with respect to the corresponding laser array axis, of one of the multiple semiconductor laser arrays is configured to provide a reference laser beam to the internal optical reference path.

Optionally, the multiple semiconductor lasers arrays are arranged that the laser emitters are arranged in an elongated distribution, particularly in a direction corresponding to the splitting direction or along the longitudinal direction of the oblong arrangement section, and a laser emitter at one of the axial ends with respect to a longitudinal axis of the elongated distribution is configured to provide the reference laser beam to the internal optical reference path.

Optionally, the multiple semiconductor lasers arrays are arranged that the laser emitters are distributed along an arrangement direction corresponding to the splitting direction, and the laser emitter providing the reference laser beam to the internal optical reference path is arranged at the axial end towards the gap, particularly wherein the laser emitter providing the reference laser beam is offset from the rest of the laser emitters of the same semiconductor laser array by a distance of more than the pitch of the rest of the laser emitters, particularly at least three times the pitch.

Optionally, the receiver unit comprises a receiver array, a plurality of amplifiers, particularly transimpedance amplifiers, a selector, particularly comprising a multiplexer circuit, and a signal analyzer, particularly comprising an analog-to-digital circuit, more particularly a multi-channel analog-to-digital circuit or a time-to-digital converter, wherein the receiver array has a plurality of receiving surfaces arranged along a respective receiver array axis for separately capturing individual transmission beams of the outgoing beam pattern, particularly wherein each of the transmission beams of the outgoing beam pattern is uniquely assigned to one of the receiving surfaces, more particularly by a ono-to-one assignment of individual transmission beams to individual receiving surfaces, each amplifier of the plurality of amplifiers is connected to several, particularly adjacent, receiving surfaces of the plurality receiving surfaces, and the plurality of amplifiers is connected to the analyzer via the selector.

What is claimed is:

1. An absolute distance measuring device comprises:
    a transmission unit having:
        at least one laser array, the laser array comprising multiple measurement laser emitters arranged along a laser array axis and configured to generate a beam pattern, and
        a beam exit area,
    the transmission unit being configured to emit a plurality of transmission beams via the beam exit area at different measurement angles; and
    a receiver unit having:
        a measurement beam entry area, and
        at least one receiver array comprising multiple measurement receivers arranged along a receiver array axis,
    the receiver unit being designed:
        for beam detection by a respective measurement receiver of at least one transmission beam of the plurality of transmission beams returning via the beam entry area, and
        for measuring of an absolute distance based on a respective detected transmission beam and the principle of time-of-flight,
    wherein the laser array comprises at least a first reference laser emitter and the receiver array comprises at least a first reference receiver, the reference laser emitter and reference receiver defining an internal absolute distance reference beam path of defined length for calibration of the device with respect to said measuring of absolute distance,
    wherein the device further comprises:
        a second reference laser emitter in addition to and separate from the laser array, and
        a second reference receiver in addition to and separate from the receiver array.

2. The absolute distance measuring device according to claim 1, wherein
    one of the measurement laser emitters serves as first reference laser emitter, or
    one of the measurement receivers serves as first reference receiver.

3. The absolute distance measuring device according to claim 1, wherein the internal absolute distance reference beam path is subdivided into:
- a first distance reference beam path defined between the first reference laser emitter and the second reference receiver,
- a second absolute distance reference beam path defined between the second reference laser emitter and the second reference receiver, and
- a third absolute distance reference beam path defined between the second reference laser emitter and the first reference receiver.

4. The absolute distance measuring device according to claim 1, wherein the device comprises:
- at least one optical guiding or deflection element for guiding part of the laser light of at least one, in particular all, laser emitter of the laser array to the second reference receiver, or
- at least one optical guiding or deflection element for guiding laser light of the second reference laser emitter directly to at least one receiver of the receiver array, or
- at least one optical guiding or deflection element for guiding laser light of the second reference laser emitter directly to the second reference receiver.

5. The absolute distance measuring device according to claim 4, wherein the optical guiding or deflection element for guiding laser light of all laser emitters directly to the second reference receiver is situated in an area where the beams of all laser emitters are mixed.

6. The absolute distance measuring device according to claim 1, wherein the absolute distance measuring device further comprises a variable optical attenuator situated in the reference beam path.

7. The absolute distance measuring device according to claim 1, wherein the transmission beams are emittable as sequences of distinct laser pulses with a time gap in between subsequent sequences, and the calibration is based on at least one calibration measuring of an absolute distance of the absolute distance reference beam path of defined length using at least one laser pulse separate from the sequences of distinct laser pulses during said time gap in between subsequent sequences.

8. The absolute distance measuring device according to claim 1, wherein the device is designed for multiple calibration measurements with different laser pulse intensity for range walk calibration.

9. The absolute distance measuring device according to claim 1, wherein the internal absolute distance reference beam path is subdivided into a first, second and third absolute distance reference beam path and the calibration is based on:
- a first calibration measuring of an absolute distance of the first absolute distance reference beam path during a first time gap in between subsequent sequences of distinct laser pulses,
- a second calibration measuring of an absolute distance of the second absolute distance reference beam path of defined length during a second time gap in between subsequent sequences of the distinct laser pulses, and
- a third calibration measuring of an absolute distance of the second absolute distance reference beam path of defined length during a third time gap in between subsequent sequences of the distinct laser pulses.

10. An absolute distance measuring device comprises:
a transmission unit having:
- at least one laser array, the laser array comprising multiple measurement laser emitters arranged along a laser array axis and configured to generate a beam pattern, and
- a beam exit area, the transmission unit being configured to emit a plurality of transmission beams via the beam exit area at different measurement angles; and
a receiver unit having:
- a measurement beam entry area, and
- at least one receiver array comprising multiple measurement receivers arranged along a receiver array axis, the receiver unit being designed:
- for beam detection by a respective measurement receiver of at least one transmission beam of the plurality of transmission beams returning via the beam entry area, and
- for measuring of an absolute distance based on a respective detected transmission beam and the principle of time-of-flight,
- wherein the laser array comprises at least a first reference laser emitter and the receiver array comprises at least a first reference receiver, the reference laser emitter and reference receiver defining an internal absolute distance reference beam path of defined length for calibration of the device with respect to said measuring of absolute distance, wherein the internal absolute distance reference beam path is subdivided into a first, second and third absolute distance reference beam path and the calibration is based on:
- a first calibration measuring of an absolute distance of the first absolute distance reference beam path during a first time gap in between subsequent sequences of distinct laser pulses,
- a second calibration measuring of an absolute distance of the second absolute distance reference beam path of defined length during a second time gap in between subsequent sequences of the distinct laser pulses, and
- a third calibration measuring of an absolute distance of the second absolute distance reference beam path of defined length during a third time gap in between subsequent sequences of the distinct laser pulses.

* * * * *